US011555125B2

(12) United States Patent
Kawamura et al.

(10) Patent No.: US 11,555,125 B2
(45) Date of Patent: Jan. 17, 2023

(54) COATED STEEL SHEET AND PAINTED MEMBER

(71) Applicant: NIPPON STEEL CORPORATION, Tokyo (JP)

(72) Inventors: Yasuaki Kawamura, Tokyo (JP); Yoichiro Mori, Tokyo (JP); Ikuro Yamaoka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 841 days.

(21) Appl. No.: 16/461,736

(22) PCT Filed: Nov. 17, 2016

(86) PCT No.: PCT/JP2016/084148
§ 371 (c)(1),
(2) Date: May 16, 2019

(87) PCT Pub. No.: WO2018/092244
PCT Pub. Date: May 24, 2018

(65) Prior Publication Data
US 2019/0330478 A1  Oct. 31, 2019

(51) Int. Cl.
| C09D 5/08 | (2006.01) |
| B05D 7/14 | (2006.01) |
| B05D 7/00 | (2006.01) |
| C08K 3/22 | (2006.01) |
| C08K 3/28 | (2006.01) |
| C08K 3/38 | (2006.01) |
| C09D 5/24 | (2006.01) |
| C09D 201/00 | (2006.01) |

(52) U.S. Cl.
CPC .............. *C09D 5/08* (2013.01); *B05D 7/14* (2013.01); *B05D 7/52* (2013.01); *C08K 3/22* (2013.01); *C08K 3/28* (2013.01); *C08K 3/38* (2013.01); *C09D 5/24* (2013.01); *C09D 201/00* (2013.01); *B05D 2202/10* (2013.01); *B05D 2252/00* (2013.01); *B05D 2701/40* (2013.01); *C08K 2003/222* (2013.01); *C08K 2003/2206* (2013.01); *C08K 2003/2296* (2013.01)

(58) Field of Classification Search
CPC .......... C09D 5/08; C09D 201/00; C09D 5/24; C08K 3/38; C08K 3/28; C08K 2003/222; C08K 3/22; C08K 2003/2296; C08K 2003/2206; B05D 7/52; B05D 2202/10; B05D 2252/00; B05D 2701/40; B05D 7/14
USPC ........................................................ 428/457
See application file for complete search history.

(56) References Cited

U.S. PATENT DOCUMENTS

| 2003/0175541 | A1 | 9/2003 | Lorenz et al. |
| 2003/0235711 | A1 | 12/2003 | Seido et al. |
| 2012/0263966 | A1 | 10/2012 | Jung et al. |
| 2013/0161062 | A1 | 6/2013 | Yamaoka et al. |
| 2014/0342180 | A1 | 11/2014 | Kaneko et al. |
| 2015/0044450 | A1* | 2/2015 | Yuasa ...................... C09D 7/61 428/335 |

FOREIGN PATENT DOCUMENTS

| EP | 3279369 A1 | 2/2018 |
| JP | 55-17508 A | 2/1980 |
| JP | 63-186777 A | 8/1988 |
| JP | 9-276788 A | 10/1997 |
| JP | 2000-70842 A | 3/2000 |
| JP | 2003-55777 A | 2/2003 |
| JP | 2003-513141 A | 4/2003 |
| JP | 2003-268567 A | 9/2003 |
| JP | 2003-532778 A | 11/2003 |
| JP | 2004-42622 A | 2/2004 |
| JP | 2004-83922 A | 3/2004 |
| JP | 2005-154812 A | 6/2005 |
| JP | 2005-288730 A | 10/2005 |
| JP | 2005-325427 A | 11/2005 |
| JP | 2007-239004 A | 9/2007 |
| JP | 2008-23975 A | 2/2008 |
| JP | 2012-162713 A | 8/2012 |
| JP | 2013-60647 A | 4/2013 |
| JP | 2013-515854 A | 5/2013 |
| JP | 2015/91657 A | 5/2015 |
| JP | 2015-202686 A | 11/2015 |
| WO | WO 2012/029988 A1 | 3/2012 |

OTHER PUBLICATIONS

Brazilian Office Action for corresponding Brazilian Application No. 112019009769-4, dated Mar. 24, 2020, with partial English translation.
Extended European Search Report for corresponding European Application No. 16921622.3, dated Mar. 31, 2020.
International Search Report for PCT/JP2016/084148 dated Dec. 20, 2016.
Written Opinion of the International Searching Authority for PCT/JP2016/084148 (PCT/ISA/237) dated Dec. 20, 2016.

* cited by examiner

Primary Examiner — Hui H Chin
(74) Attorney, Agent, or Firm — Birch, Stewart, Kolasch & Birch, LLP

(57) ABSTRACT

A coated steel sheet has a coating film on at least one side of a plated steel sheet. The coating film contains a binder resin, non-oxide ceramic particles containing V (excluding VC particles), and doped zinc oxide particles. The respective contents of the non-oxide ceramic particles containing V and the doped zinc oxide particles relative to the coating film satisfy the expressions: [(1) $C_{Zn} \geq 10.0$, (2) $C_V \leq 0.5 \cdot C_{Zn}$, (3) $C_V \leq 70 - C_{Zn}$, (4) $C_V \geq 0.125 \cdot C_{Zn}$, and (5) $C_V \geq 2.0$], where $C_V$ represents the content (mass %) of the non-oxide ceramic particles containing V, and $C_{Zn}$ represents the content (mass %) of the doped zinc oxide particles. The coated steel sheet is excellent in both corrosion resistance before electrodeposition coating, and weldability.

14 Claims, No Drawings

COATED STEEL SHEET AND PAINTED MEMBER

TECHNICAL FIELD

The present invention relates to a coated steel sheet and a painted member.

BACKGROUND ART

Most members for automobile body are formed using, for example, sheets such as steel sheets as a starting material. The members for automobile body are produced by, for example, undergoing numerous processes such as (1) a blanking process in which a metal sheet is cut to a prescribed size, (2) an oil cleaning process in which the blanked metal sheet is cleaned with oil, (3) a process in which the metal sheet cleaned with oil is press-formed to obtain a formed material, (4) a joining process in which the formed materials are assembled into a member with a desired shape by spot welding, adhesion or the like, (5) a process in which the press oil of the surface of the joined member is removed and the surface is cleaned; (6) a chemical treatment process, and (7) an electrodeposition coating process. Further, in a case where a member for automobile body use is to be used as an outer sheet, generally the member for automobile body use also undergoes, for example, coating processes such as (8) an intermediate coating process and (9) an over-coating process. Thus, in the automotive industry, there is a high demand for cost reduction by omitting and simplifying production processes, in particular the chemical treatment process and the coating process.

The corrosion resistance of a member for automobile body use is usually ensured by a chemical treatment film formed by a chemical treatment process, and an electrodeposition coating film formed by a subsequent electrodeposition coating process. However, portions over which neither the chemical treatment film nor the electrodeposition coating film reaches may be left at joint portions (sheet overlapping parts) of the formed materials, in particular at a sheet overlapping part and a hemming portion and the like of the inner surface of a closed section member. In such a case, the possibility of a joint portion of the formed material being exposed to a corrosive environment in an uncovered state increases. Hence, the corrosion resistance of the joint portion of the formed material is compensated for by using an anti-rust subsidiary material such as body sealer, undercoating, adhesives, or wax applied on the inner closed portion. These anti-rust subsidiary materials are not only a factor that increases the cost of automobile production, but are also a factor in reducing productivity and increasing the vehicle body weight. Therefore, there has been a high demand for members for automobile body in which corrosion resistance can be ensured even when the amounts of these anti-rust subsidiary materials are reduced.

To address these demands, much research and development has been conducted regarding coated steel sheets that enable the omission of the chemical treatment process, the omission or simplification of the electrodeposition coating process, and the omission or reduction of the anti-rust subsidiary materials to be achieved at the same time during automobile production. Coated steel sheets of such kind are, for example, press-formed, and are then assembled into a desired shape by spot welding or the like, and thereafter are subjected to electrodeposition coating, or coated with an intermediate coat in a case where an electrodeposition coating process is omitted. For this reason, it is necessary to improve the press-formability and to provide the coating film with electrical conductivity so that resistance welding or further electrodeposition coating can be performed on the coated steel sheet, and also impart corrosion resistance.

For example, Patent Document 1 discloses that a galvannealed steel sheet having a resin-based electroconductive coating film that contains zinc powder has high corrosion resistance and is weldable. Further, Patent Document 1 discloses that, in the galvannealed steel sheet, preferably the amount of zinc powder contained in the coating film is 30 to 90 mass %, and that the coating film thickness is preferably 2 to 30 µm.

Further, Patent Document 2 discloses that an organic-composite plated steel that has an anti-rust treatment layer, which is mainly composed of a chromium compound over which an organic resin coating film that contains 3 to 59 vol % of electroconductive powder and an anti-corrosive pigment is covered to a thickness of 0.5 to 20 µm, is excellent in corrosion resistance and is capable of undergoing resistance welding. It is also described in Examples in Patent Document 2 that, by using iron phosphide, Fe—Si alloy, Fe—Co alloy or the like as the electroconductive powder, the organic-composite plated steel is excellent in corrosion resistance and spot weldability.

Patent Document 3 discloses an Ni-containing electrogalvanized steel sheet for automobile service part use in which, after forming a chromate primer by a chromate preconditioning treatment for improving corrosion resistance and coating film adhesion, an organic resin layer that contains 25 to 45 mass % of an electrically conductive pigment mainly composed of iron phosphide and an anti-corrosive pigment is coated thereon to a thickness of 2 to 8 µm. Patent Document 3 discloses that the Ni-containing electrogalvanized steel sheet is excellent in corrosion resistance, resistance weldability and the like. In Examples in Patent Document 3, both a water-based coating resin and a solvent-based coating resin are mentioned as examples, and it is described that the coating composition for forming the resin coating layer may be either a water-based or a solvent-based composition.

Patent Document 4 discloses a water-based coating agent as a metal surface coating agent that enables the formation of a corrosion resistance film having electrical conductivity and can be welded, and that contains 10 to 30 mass % of a specific organic binder and 30 to 60 mass % of an electrically conductive powder. In Patent Document 4, zinc, aluminum, graphite, carbon black, molybdenum sulfide, and iron phosphide are mentioned as examples of the electrically conductive powder, which is suitable for the preparation of the water-based coating agent.

Patent Document 5 and Patent Document 6 disclose an organic coated steel sheet for automobile use that achieves both excellent corrosion resistance and weldability obtained by coating the surface of a galvanized steel sheet or an aluminum plated steel sheet with a first layer film that reinforces the adhesion to the plating layer and, via the first layer film, a resin-based second layer film that contains an electrically conductive pigment and a rust-preventive addition agent. In Patent Document 5 and Patent Document 6, a water-based coating composition is exemplified as the coating composition for forming the first layer film, and both a water-based coating composition and a solvent-based coating composition are exemplified as the coating composition for forming the second layer film. In Patent Document 5 and Patent Document 6 it is described that the amount of electrically conductive pigment contained in the second layer film having a thickness of 1 to 30 µm is in the range of 5 to 70 vol %. In Patent Document 5 and Patent Document 6, a metal, an alloy, electrically conductive carbon, iron phosphide, carbides, and semiconductor oxides are mentioned as examples of a suitable electrically conductive pigment.

Further, Patent Document 7 discloses that a coated metallic material having an electrically conductive coating film containing, as electrically conductive particles, alloy particles constituted by metal and metalloid elements or compound particles, and a specific urethane-based resin has high corrosion resistance and is weldable. In Patent Document 7 it is described that the electrically conductive particles are preferably alloys or compounds that contain 50 mass % or more of Si, and more preferably are ferrosilicon containing 70 mass % or more of Si.

Here, as technology that, among electrically conductive particles other than metal particles, uses electrically conductive ceramic particles, Patent Document 8, for example, discloses that an electroconductive material-coated corrosion resistant metal material obtained by covering a core metal with a cladding layer composed of a corrosion resistant metal, and then covering the surface thereof with a surface treatment layer composed of pieces of an electroconductive material and any resin that binds these pieces is excellent in corrosion resistance and electrical conductivity. In Patent Document 8, titanium, zirconium, tantalum, niobium, or alloys of these elements are mentioned as examples of the corrosion resistant metal. Further, in Patent Document 8, at least one type of material selected from the group consisting of a carbon material, an electrically conductive ceramic, and a metal powder is mentioned as an example of the electroconductive material.

Patent Document 9 discloses an electrically conductive and weldable anti-corrosion composition for coating metal surfaces. The anti-corrosion composition contains, based on the overall composition: (a) 5 to 40 mass % of an organic binder containing (aa) at least one epoxy resin, (ab) at least one hardening agent selected from cyanoguanidine, benzoguanamine and plasticized urea resin, and (ac) at least one amine adduct selected from polyoxyalkylene triamine and epoxy resin/amine adducts; (b) 0 to 15 mass % of an anti-corrosion pigment; (c) 40 to 70 mass % of an electrically conductive pigment selected from powdered zinc, aluminum, graphite, molybdenum sulfide, carbon black and iron phosphide; (d) 0 to 45 mass % of a solvent; and as required, up to 50 mass % of other active or auxiliary substances.

Patent Document 10 discloses that a galvanized steel sheet obtained from a silane coupling agent (a1) having a glycidyl group, a tetraalkoxysilane (a2), and a chelating agent (a3) contains a silane compound (A) having a hydrolyzable group; a zirconium carbonate compound (B); a vanadate compound (C); a nitrate compound (D); and water; and is subjected to a surface treatment using a surface treatment solution having a pH of 8 to 10.

Patent Document 11 discloses an inner magnetic shield starting material having, on at least one side of a steel strip having a surface roughness in the range of 0.2 to 3 μm Ra, an organic resin coating that is composed substantially of C and H, or C, H and O, or C, H, O and N and has a thickness of 0.1 to 6 μm. The inner magnetic shield starting material is characterized in that the organic resin coating contains either or both of (a) at least one type of coupling agent in a total amount of 2 to 50 mass %, and (b) at least one type of metal oxide selected from the group consisting of $SiO_2$, $Fe_3O_4$, $Fe_2O_3$, Ni—O, Zr—O, $Cr_2O_3$ and $Al_2O_3$ in a total amount of 2 to 80 mass %.

Patent Document 12 discloses a chromate-free chemical treated hot-dip zinc-aluminum alloy plated steel sheet having, on the surface of the steel sheet, a Zn alloy plating layer containing 1 to 10 mass % of Mg, 2 to 19 mass % of Al, and 0.01 to 2 mass % of Si, in which Mg and Al satisfy the relation: Mg (mass %)+Al (mass %) 20 mass %, with the balance being Zn and unavoidable impurities. The chromate-free chemical treated hot-dip zinc-aluminum alloy plated steel sheet is characterized by further having a coating film containing 10 to 30 mass % of a zirconium compound as zirconium and 5 to 20 mass % of a vanadyl compound as vanadium on an outer layer of the Zn alloy plating layer with a coating mass of at least 200 to 1200 mg/m$^2$ on one side. As a result, the chromate-free chemical treated hot-dip zinc-aluminum alloy plated steel sheet is excellent in weldability and corrosion resistance.

Patent Document 13 discloses a coated steel sheet containing, as a first layer film on the surface of a galvanized steel sheet or an aluminum-plated steel sheet, (α) silica, (β) phosphoric acid and/or a phosphate compound, (γ) one or more types of metal selected from the group consisting of Mg, Mn and Al (including a case where the metals are contained as compounds and/or complex compounds), and (σ) a tetravalent vanadium compound.

Patent Document 14 discloses a plated steel sheet for a can that is characterized by having, in order from the steel sheet side, at least a metallic tin layer, a tin oxide layer having a quantity of electricity satisfying 0.3 to 2.5 mC/cm$^2$ required for reduction, and a chemically treated layer having the phosphate or polymetaphosphate of one or more types of element selected from Sn, Fe, Al, Mg, Ca, Ti, Ni, Co and Zn in a quantity of 0.1 to 5 mg/m$^2$ as a P content.

Patent Document 15 discloses a pre-coated steel sheet that is coated with a resin metal composition for coating that includes: a main resin, a hardening agent, and one or more types of single metal powder selected from the group consisting of Ni, Co, Mn, Fe, Ti, Cu, Al, Zn, Sn and Fe$_2$P powder or an alloy powder thereof.

Patent Document 16 discloses a pre-coated metal sheet for automobile use that includes a sheet, and a coating film (α) provided on at least one surface of the sheet. In the coated sheet for automobile use, the coating film (α) contains: an organic resin (A), non-oxide ceramic particles (B) that are selected from at least one type of particles among the group consisting of boride, carbide, nitride, and silicide particles and that have an electric resistivity at 25° C. of $0.1 \times 10^{-6}$ to $185 \times 10^{-6}$ Ωcm, and an anti-corrosive pigment (C).

Patent Document 17 discloses a pre-coated sheet for automobile use that includes a sheet, and a coating film (α) provided on at least one surface of the sheet. In the coated sheet for automobile use, the coating film contains: an organic resin (A); an electrically conductive pigment (B) selected from at least one type among borides, carbides, nitrides and silicides; an anti-corrosive pigment (C); and metal oxide fine particles (D).

Patent Document 18 discloses a corrosion resistant pre-coated sheet in which a coating film (α) that contains an organic resin (A) and non-oxide ceramic particles (B) with an electrical resistivity at 25° C. of $0.1 \times 10^{-6}$ to $185 \times 10^{-6}$ Ωcm that are at least one type of particle selected from borides, carbides, nitrides and silicides is formed on at least one surface of the sheet.

Patent Document 19 discloses a galvanized steel sheet for a back cover of a display device that uses a thin display panel. In the galvanized steel sheet, an inorganic-organic composite-based treated film having a film volume of 0.3 to 0.7 g/m² is formed on the surface on a side that serves as the inner surface of the back cover.

LIST OF PRIOR ART DOCUMENTS

Patent Document

Patent Document 1: JP55-17508A
Patent Document 2: JP9-276788A
Patent Document 3: JP2000-70842A
Patent Document 4: JP2003-513141A
Patent Document 5: JP2005-288730A
Patent Document 6: JP2005-325427A
Patent Document 7: JP2004-42622A
Patent Document 8: JP2003-268567A
Patent Document 9: JP2003-532778A
Patent Document 10: JP2013-60647A
Patent Document 11: JP2004-83922A
Patent Document 12: JP2003-55777A
Patent Document 13: JP2005-154812A
Patent Document 14: JP2007-239004A
Patent Document 15: JP2013-515854A
Patent Document 16: JP2015-91657A
Patent Document 17: JP2015-202686A
Patent Document 18: WO 2012/029988
Patent Document 19: JP2008-23975A

SUMMARY OF INVENTION

Technical Problem

For coated steel sheets that are widely utilized for automobile members, machine members, home electrical appliance members, and building materials and the like, if the thickness of an electrodeposition film of the coated steel sheet is thin, it is necessary to improve the corrosion resistance before electrodeposition coating in order to increase the corrosion resistance if flaws arise in the electrodeposited coating film. On the other hand, the coated steel sheets are also required to have weldability.

However, although the corrosion resistance before electrodeposition coating and the weldability have been the subject of research and development in the technologies described in the prior art documents mentioned above, the present situation is that further improvement is desired amid the increasing level of requirements in recent years.

Therefore, an objective of the present invention is to provide a coated steel sheet that is excellent in both corrosion resistance before electrodeposition coating and weldability, and to also provide a painted member that utilizes the coated steel sheet.

Solution to Problem

<1> A coated steel sheet having a coating film on at least one side of a plated steel sheet, wherein:
the coating film contains:
a binder resin,
non-oxide ceramic particles containing V (excluding VC particles), and
doped zinc oxide particles; and
a content of the non-oxide ceramic particles containing V and a content of the doped zinc oxide particles relative to the coating film satisfy the following expressions:

$$C_{Zn} \geq 10.0 \quad (1)$$

$$C_V \leq 0.5 \cdot C_{Zn} \quad (2)$$

$$C_V \leq 70 - C_{Zn} \quad (3)$$

$$C_V \geq 0.125 \cdot C_{Zn} \quad (4)$$

$$C_V \geq 2.0 \quad (5)$$

where, $C_V$ represents the content (mass %) of the non-oxide ceramic particles containing V, and $C_{Zn}$ represents the content (mass %) of the doped zinc oxide particles.

<2> The coated steel sheet according to the above <1>, wherein:
the coating film contains an anti-corrosive pigment.

<3> The coated steel sheet according to the above <1> or <2>, wherein:
the binder resin is a water-soluble or water-dispersible water-based resin.

<4> The coated steel sheet according to any one of the above <1> to <3>, wherein:
the non-oxide ceramic particles containing V are at least one type of particle selected from a group consisting of:
vanadium monoboride particles (VB particles),
vanadium diboride particles (VB₂ particles), and
vanadium nitride particles (VN particles).

<5> The coated steel sheet according to any one of the above <1> to <4>, wherein:
the coating film contains at least one type of particle selected from a group consisting of:
non-doped zinc oxide particles,
magnesium oxide particles,
calcium oxide particles, and
strontium oxide particles,
in a total amount within a range of 1.0 to 10.0 mass % relative to the coating film.

<6> The coated steel sheet according to any one of the above <1> to <5>, wherein:
the coating film contains an anti-corrosive pigment containing Mg, in an amount within a range of 5.0 to 40.0 mass % relative to the coating film.

<7> The coated steel sheet according to any one of the above <1> to <6>, wherein:
the plated steel sheet is a galvanized steel sheet or an aluminum-plated steel sheet.

<8> A painted member, comprising:
a formed material comprising a coated steel sheet according to any one of the above <1> to <7>, and having the coating film, and
an electrodeposition coating film that is formed on the coating film.

Advantageous Effects of Invention

According to the present invention, a coated steel sheet that is excellent in both corrosion resistance before electrodeposition coating, and weldability, and a painted member that utilizes the coated steel sheet can be provided.

DESCRIPTION OF EMBODIMENTS

An embodiment that is an example of the present invention will now be described.

<Coated Steel Sheet>

A coated steel sheet according to the present embodiment has a coating film (hereinafter, also referred to as "resin coating film") on at least one side of a plated steel sheet. The coating film contains a binder resin, non-oxide ceramic particles containing V (excluding VC particles), and doped zinc oxide particles. The content of the non-oxide ceramic particles containing V and the content of the doped zinc oxide particles relative to the coating film satisfy the following expressions:

$$C_{Zn} \geq 10.0 \quad (1)$$

$$C_V \leq 0.5 \cdot C_{Zn} \quad (2)$$

$$C_V \leq 70 - C_{Zn} \quad (3)$$

$$C_V \geq 0.125 \cdot C_{Zn} \quad (4)$$

$$C_V \geq 2.0 \quad (5)$$

Where, $C_V$ represents the content (mass %) of the non-oxide ceramic particles containing V, and $C_{Zn}$ represents the content (mass %) of the doped zinc oxide particles.

By having the aforementioned configuration, the coated steel sheet of the present embodiment is excellent in both corrosion resistance before electrodeposition coating, and weldability. The reasons are presumed to be as follows.

As a method for realizing weldability in a coated steel sheet, generally, a method may be mentioned that realizes spot weldability by making the thickness of a resin coating film that is formed on the steel sheet surface thin, and when a spot electrode is applied to a resin coating film during spot welding, contacting the electrode surface against the steel sheet surface through a thin resin coating film or directly against a portion at which the steel sheet surface is exposed. As another method, a method may be mentioned that realizes spot weldability by adding an electrically conductive pigment that is excellent in electrical conductivity to a resin coating film so that, when a spot electrode is applied to the resin coating film during spot welding, the spot electrode and the electrically conductive pigment in the resin coating film contact, and furthermore, the electrically conductive pigment and the steel sheet surface contact. In the former method, the weldability can be enhanced by making the thickness of the resin coating film thinner. In the latter method, the weldability can be enhanced by increasing the added amount of the electrically conductive pigment.

However, in the case of the former method that is described above, it is difficult to secure excellent corrosion resistance before electrodeposition coating because of the thin resin coating film that enables spot welding. In the case of the latter method, the resin coating film does not contribute to corrosion resistance, and contains electrically conductive pigment of a particle size that traverses the resin coating film cross-section. Consequently, when a corrosion resistance test or the like is conducted, the interface between the binder resin and the electrically conductive pigment in the resin coating film is liable to serve as a penetration route for water or a saline solution or the like, and it is difficult to secure excellent corrosion resistance before electrodeposition coating.

As a method for solving the above problems, it is considered that by adding an electrically conductive pigment that has both electrical conductivity and corrosion resistance performance in the resin coating film, it is possible to secure the corrosion resistance before electrodeposition coating of the coated steel sheet while also securing the weldability thereof. Therefore, as the result of searching for an electrically conductive pigment having excellent corrosion resistance performance, the present inventors confirmed that non-oxide ceramic particles containing V, excluding vanadium-carbide particles (VC particles), have excellent electrical conductivity and are also excellent in corrosion resistance.

That is, non-oxide ceramic particles containing V, with the exception of vanadium-carbide particles (VC particles), have high electrical conductivity, and on the other hand, some of the pigment elutes upon contact with water or saline solution or the like and releases V ions to thereby exhibit an excellent rust prevention effect similarly to V-based compounds and V-based anti-corrosive pigments that are used for chromium-free coated steel sheets and coated steel sheets. Therefore, the corrosion resistance of the resin coating film itself is enhanced by the non-oxide ceramic particles containing V, excluding vanadium-carbide particles (VC particles). On the other hand, with respect to vanadium-carbide particles (VC particles), although the vanadium-carbide particles release V ions similarly to other non-oxide ceramic particles containing V, after release of the V ions, C adversely affects the corrosion resistance, and it is considered that, as a result, the vanadium-carbide particles do not exhibit an excellent rust prevention effect when compared to other electrically conductive pigments containing V.

In addition, it is considered that the weldability of a coated steel sheet can be further enhanced by making non-oxide ceramic particles containing V excluding vanadium-carbide particles (VC particles), and doped zinc oxide particles co-exist in a resin coating film and also adjusting the content of the non-oxide ceramic particles containing V (excluding VC particles) and the doped zinc oxide particles to be within a predetermined range, since adhesion to electrodes can be made favorable while also securing electrical conductivity.

For the foregoing reasons, it is presumed that the coated steel sheet according to the present embodiment is excellent in both corrosion resistance before electrodeposition coating, and weldability. That is, it is estimated that both corrosion resistance before electrodeposition coating, and weldability are realized by the coated steel sheet.

Further, in the coated steel sheet according to the present embodiment, because the corrosion resistance of the resin coating film itself is high by virtue of using the non-oxide ceramic particles containing V that exclude vanadium-carbide particles (VC particles), the resin coating film can be realized as a thin film while achieving both corrosion resistance before electrodeposition coating, and weldability. Therefore, the resin amount of the resin coating film is reduced, and a decrease in the amount of gas that is produced during welding of the coated steel sheet can also be realized. Further, by making the resin coating film a thin film, variations in the film resistance of the resin coating film are also suppressed, and uniform weldability can be realized.

Note that, in the coated steel sheet according to the present embodiment, in accordance with the intended use, the resin coating film may be formed on both sides of the plated steel sheet or may be formed on only one side of the plated steel sheet. Further, the resin coating film may be formed at one part of the surface of the plated steel sheet, or may be coated over the entire surface of the plated steel sheet. A region of the plated steel sheet in which the resin coating film is formed will be excellent in corrosion resistance before electrodeposition coating and weldability.

The coated steel sheet according to the present embodiment is described in further detail hereunder.

<Plated Steel Sheet>

Well-known plated steel sheets such as a galvanized steel sheet and an aluminum-plated steel sheet may be mentioned as examples of the plated steel sheet. The steel sheet may be a plain steel sheet or a steel sheet containing an additive element such as chromium. However, in the case of press-forming, the steel sheet is preferably a steel sheet in which the types and added amounts of additive elements and the steel micro-structure are appropriately controlled so as to provide the desired forming process followability.

As examples of the galvanized layer of the galvanized steel sheet, a plating layer composed of zinc, an alloy plating layer composed of zinc and at least one type of element among aluminum, cobalt, tin, nickel, iron, chromium, titanium, magnesium, and manganese, and various zinc-based alloy plating layers that further contain another metal element or non-metal element (for example, a quaternary alloy plating layer of zinc, aluminum, magnesium, and silicon) may be mentioned. However, in the galvanized layer, the alloy components other than zinc are not particularly limited.

Note that these galvanized layers may further contain small amounts of different metal elements or impurities such as cobalt, molybdenum, tungsten, nickel, titanium, chromium, aluminum, manganese, iron, magnesium, lead, bismuth, antimony, tin, copper, cadmium, and arsenic, and may contain an inorganic substance such as silica, alumina, or titania.

As examples of the aluminum-based plating layer of the aluminum-plated steel sheet, a plating layer composed of aluminum, and an alloy plating layer composed of aluminum and at least one type of element among silicon, zinc, and magnesium (for example, an alloy plating layer composed of aluminum and silicon, an alloy plating layer composed of aluminum and zinc, and a ternary alloy plating layer composed of aluminum, silicon, and magnesium), and the like may be mentioned.

The galvanized steel sheet and the aluminum-plated steel sheet may also each be a multiple-layer plated steel sheet in which the aforementioned plating layer is combined with another type of plating layer (for example, an iron plating layer, an alloy plating layer of iron and phosphorus, a nickel plating layer, or a cobalt plating layer).

The method for forming the plating layer of the plated steel sheet is not particularly limited. For example, electrolytic plating, electroless plating, hot dipping, vapor deposition plating, dispersion plating or the like may be utilized to form the plating layer. The plating layer may be formed by either the continuous system or the batch system. Further, after the formation of the plating layer, a treatment such as zero spangle treatment that is a treatment for obtaining a uniform external appearance, an annealing treatment that is a treatment for modifying the plating layer, or temper rolling for adjusting the surface condition or the material quality may be performed.

<Resin Coating Film>

The resin coating film contains a binder resin, non-oxide ceramic particles containing V excluding vanadium-carbide particles (VC particles), and doped zinc oxide particles. The resin coating film may also contain other components, as necessary.

(Binder Resin)

Although the binder resin may be either of a water-soluble or water-dispersible water-based resin that is dissolved or dispersed in water, and a solvent-based resin that is dissolved or dispersed in an organic solvent, a water-based resin is preferable in terms of production cost and environmental compatibility.

As examples of the water-based resin, water-soluble or water-dispersible resins such as a polyester resin, a urethane resin, a polyolefin resin, an acrylic resin, an epoxy resin, and a phenol resin, and a mixed resin of two or more types of these resins may be mentioned. In a case where a polyester resin is used as the water-based resin, the molecular weight is preferably in the range of 10,000 to 30,000. If the molecular weight is less than 10,000, it may be difficult to ensure sufficient workability. On the other hand, if the molecular weight is more than 30,000, the area of the bonding site of the resin itself will be reduced, and it may be difficult to ensure excellent adhesion to an electrodeposition coating film. Furthermore, when crosslinking is performed using a hardening agent such as melamine, the crosslinking reaction may not be sufficiently produced, and performance as a resin coating film may be reduced. In a case where a urethane resin is used as the water-based resin, the urethane resin is preferably in the form of an emulsion with an emulsion particle diameter in a range of 10 to 100 nm (preferably 20 to 60 nm). If the emulsion particle diameter is excessively small, the cost may be increased. On the other hand, if the emulsion particle diameter is excessively large, the gap between emulsions may be increased when the resin is made into a coating film, and barrier properties as a resin coating film may be reduced. The type of the urethane resin is not particularly limited, and examples thereof include an ether-based type, a polycarbonate-based type, an ester-based type, and an acrylic graphite type. These may be used singly or in combination.

On the other hand, examples of the solvent-based resin include a polyester resin, a urethane resin, an epoxy resin, and an acrylic resin, as well as a mixed resin of two or more types of these resins.

Here, the binder resin may be a crosslinked resin having a crosslinked structure, or may be a non-crosslinked resin that does not have a crosslinked structure. However, from the viewpoint of forming the resin coating film at low temperature, the binder resin is preferably a non-crosslinked resin. The crosslinking agent (hardening agent) that provides the binder resin with a crosslinked structure is preferably a water-soluble crosslinking agent. Specifically, melamine, an isocyanate, a silane compound, a zirconium compound, a titanium compound or the like is preferable as the crosslinking agent.

The added amount of the crosslinking agent is preferably 5 parts by mass to 30 parts by mass relative to 100 parts by mass of the resin solid content. If the added amount of the crosslinking agent is less than 5 parts by mass, the crosslinking reaction with the resin may decrease, and performance as a coating film may be insufficient. On the other hand, if the added amount of the crosslinking agent is more than 30 parts by mass, the crosslinking reaction may proceed excessively and the resin coating film may be excessively hardened, and consequently workability may be reduced, and in addition, in a case where a silane compound, a zirconium compound or a titanium compound is used as the crosslinking agent, the coating stability may also decrease.

The content of the binder resin is preferably in the range of 10.0 to 60.0 mass % relative to the resin coating film (the total solid content of the coating film). If the content of the binder resin is less than 10 mass %, the function as a binder may not be exhibited, and the cohesive force of the resin coating film may be reduced, and hence a fracture in the coating film (a cohesive failure of the coating film) is likely to occur when an adhesion test or forming is performed. If the content of the binder resin is more than 60.0 mass %, the ratio of the pigment component contained in the resin coating film will be reduced, and it may be difficult to achieve all of weldability, corrosion resistance before electrodeposition coating, and adhesion to an electrodeposition coating film. The content of the binder resin is more preferably within the range of 15.0 to 50.0 mass % relative to the resin coating film (the total solid content of the coating film), from the viewpoint of exhibiting the binder function and achieving all of weldability, corrosion resistance before electrodeposition coating, and the adhesion to an electrodeposition coating film.

(Non-Oxide Ceramic Particles Containing V)

The non-oxide ceramic particles containing V of the present embodiment are preferably composed of a non-oxide ceramic (a boride ceramic, a nitride ceramic, a silicide ceramic, or the like) for which the electrical resistivity (volume resistivity, or specific resistance) at 25° C. is in the range of $0.1 \times 10^{-6}$ to $185 \times 10^{-6}$ Ωcm.

Here, the term "non-oxide ceramic containing V" refers to a ceramic composed of elements other than oxygen or a compound that does not contain oxygen. Further, the terms "boride ceramic", "nitride ceramic" and "silicide ceramic" refer to non-oxide ceramics containing V that have boron B, nitrogen N, and silicon Si as a main non-metal constituent element, respectively. These are all non-oxide ceramics having an electrical resistivity at 25° C. of less than $0.1 \times 10^{-6}$ Ωcm or more.

As examples of the non-oxide ceramic particles containing V of the present embodiment, vanadium monoboride particles (VB particles; electric resistivity $35 \times 10^{-6}$ Ωcm), vanadium diboride particles ($VB_2$ particles; electric resistivity $150 \times 10^{-6}$ Ωcm) and vanadium nitride particles (VN particles; electric resistivity $150 \times 10^{-6}$ Ωcm), as well as vanadium silicide particles such as $V_5Si3$ particles (electric resistivity $115 \times 10^{-6}$ Ωcm) and $VSi_2$ particles (electric resistivity $9.5 \times 10^{-6}$ Ωcm) may be mentioned.

The non-oxide ceramic particles containing V of the present embodiment exclude VC particles. In addition to VC particles, the non-oxide ceramic particles containing V of the present embodiment may also exclude vanadium-carbide particles such as $V_2C$ particles.

Note that, the electrical resistivities additionally written in the parentheses of the non-oxide ceramics containing V given as examples are representative values (literature values) of those commercially available and in use as industrial applications materials. These electrical resistivities increase or decrease depending on the type and amount of impurity elements that have entered the crystal lattice of the non-oxide ceramic. Therefore, these materials may be used after checking that the electrical resistivity is in the range of $0.1 \times 10^{-6}$ to $185 \times 10^{-6}$ Ωcm by, for example, actually measuring the electrical resistivity at 25° C. using the four-terminal four-probe method and the constant current application system in accordance with JIS K7194, using a resistivity meter Loresta EP (MCP-T360 type) and ESP probes (the diameter of the flat head portion of the terminal: 2 mm) manufactured by Mitsubishi Chemical Analytech Co., Ltd.

In the present embodiment, from the viewpoint that a large amount of V ions are released, the rust prevention effect is also extremely good, and the particles exhibit an extremely low resistance value as an electrically conductive pigment, at least one type of particle among vanadium monoboride particles (VB particles), vanadium diboride particles ($VB_2$ particles) and vanadium nitride particles (VN particles) is preferably selected as the non-oxide ceramic particles containing V (excluding VC particles).

From the viewpoint of enhancing the corrosion resistance before electrodeposition coating, it is particularly preferable that the non-oxide ceramic particles containing V (excluding VC particles) are vanadium diboride particles ($VB_2$ particles). By applying vanadium diboride particles as the electrically conductive pigment, it is possible to further increase the corrosion resistance before electrodeposition coating and the weldability. The reasons are presumed to be as follows: 1) the amount of released V ions of the vanadium diboride particles is large; 2) not only the released V ions, but also B ions also influence corrosion resistance; 3) the valence of the released V ions influences corrosion resistance.

In this case, these non-oxide ceramic particles containing V (excluding VC particles) mean substances that are mainly composed of a non-oxide containing V present in the composition for forming the resin coating film in a dispersed state in the form of a solid of several μm or more as primary particles, and not to substances that are present in a dissolved state (for example, in the case of a titanium oxide, a state of a titanium chelate or the like) in the composition.

The properties of the non-oxide ceramic particles containing V (excluding VC particles) of the present embodiment are described hereunder.

The shape of the non-oxide ceramic particles containing V (excluding VC particles) of the present embodiment is preferably a shape that is close to a sphere, such as a spherical shape, a quasi-spherical shape (for example, an ellipsoidal shape, a hen's egg-like shape, a rugby ball-like shape, or the like), or a polyhedral shape (for example, a soccer ball-like shape, a die-like shape, a brilliant cut shape of various jewels, or the like). Electrically conductive particles having a shape close to a sphere are uniformly dispersed in the resin coating film, and easily form effective current conduction paths that penetrate in the thickness direction of the resin coating film; and consequently further improve the joinability of the coated steel sheet. On the other hand, electrically conductive particles having an elongated shape (for example, a rod shape, a needle shape, a fiber shape, or the like) or a planar shape (for example, a flake shape, a flat plate shape, a thin leaf shape, or the like) may, in the formation process of the resin coating film, be arranged parallel to the surface of the coating film or be deposited near the interface between the plated steel sheet (in a case where a preconditioning treatment is performed on the surface of the plated steel sheet, the preconditioning treatment layer) and the resin coating film; and this makes it difficult to form effective current conduction paths that penetrate in the thickness direction of the resin coating film, and may reduce the joinability of the coated steel sheet.

The average particle diameter of the non-oxide ceramic particles containing V (excluding VC particles) of the present embodiment is preferably in the range of 0.5 to 10 μm. If the average particle diameter of the non-oxide ceramic particles containing V is made less than 0.5 μm, it is difficult to acquire the particles and this is disadvantageous in terms of cost, and in addition the resistance of the resin coating film during spot welding increases and consequently the spot weldability decreases. If the average particle diameter of the non-oxide ceramic particles containing V is more than 10 μm, the abundance ratio of the non-oxide ceramic particles containing V existing in the resin coating film will decrease, and consequently it will be difficult to obtain favorable corrosion resistance before electrodeposition coating.

From the viewpoint of further enhancing the corrosion resistance before electrodeposition coating and the weldability, the average particle diameter of the non-oxide ceramic particles containing V (excluding VC particles) of the present embodiment is more preferably 1 μm or more, and more preferably is not more than 5 μm. In the coated steel sheet of the present embodiment, by non-oxide ceramic particles containing V that include particles having different diameters for which the average particle diameter is within the range of 0.5 to 10 μm being blended and contained in the coating film, more favorable corrosion resistance before electrodeposition coating, and weldability can be exhibited. Note that, the smaller the particle diameter of the non-oxide ceramic particles containing V (excluding VC particles) used in the present embodiment is, the greater the improvement in corrosion resistance will be, while the larger the particle diameter is, the greater the improvement in electrical conductivity will be.

The term "average particle diameter" with respect to the non-oxide ceramic particles containing V (excluding VC particles) of the present embodiment refers to the average primary particle diameter in a case where the non-oxide ceramic particles containing V existing in the resin coating film are present singly, and in a case where the non-oxide ceramic particles containing V are present in a form in which the particles are agglomerated together, the term "average particle diameter" refers to the average secondary particle diameter that indicates the particle diameter of oxide particles when agglomerated. The average particle diameter of the non-oxide ceramic particles containing V is preferably determined by the following measurement method. First, a coated substrate on which the resin coating film is formed is cut to expose a cross section thereof, and the cross section is polished. The cross section thus obtained is observed with a scanning electron microscopy, and an observation image of the cross section in the resin coating film is obtained. Several particles are arbitrarily selected from the non-oxide ceramic particles present in the visual field of the observation image, and the length of the long side and the length of the short side of each non-oxide ceramic particle are measured. Lastly, the average value of the lengths of the long sides and the average value of the lengths of the short sides are calculated, and the thus-calculated average value of the long-side lengths and average value of the short-side lengths are further averaged to thereby calculate the average particle diameter.

Note that, the numerical value of the average particle diameter varies a little with the measurement method. For example, the numerical value may vary with the measurement principle in the case of using a particle size distribution meter, and with the image processing method in the case of image analysis. However, the range of the particle diameter of the oxide particles defined herein is a range that is defined by taking such variations in account. Regardless of which method is used to measure the particle diameter, the desired effect can be stably obtained provided that the particle diameter is within the range defined herein.

Next, the content of the non-oxide ceramic particles containing V (excluding VC particles) of the present embodiment will be described.

The content of the non-oxide ceramic particles containing V (excluding VC particles) of the present embodiment is 2.0 mass % or more relative to the resin coating film (the total solid content of the coating film). In a case where the content of the non-oxide ceramic particles containing V is less than 2.0 mass %, corrosion resistance before electrodeposition coating and weldability are not sufficiently obtained. On the other hand, the content of the non-oxide ceramic particles containing V (excluding VC particles) of the present embodiment is preferably not more than 25.0 mass % relative to the resin coating film (the total solid content of the coating film). If the content of the non-oxide ceramic particles containing V is more than 25.0 mass %, the ratio of the binder resin in the resin coating film will be reduced, and accordingly the cohesive force of the resin coating film will decrease. As a result, the adhesion to an electrodeposition coating film after electrodeposition coating may decrease.

From the viewpoint of corrosion resistance before electrodeposition coating, weldability, and adhesion to the electrodeposition coating film (corrosion resistance after electrodeposition coating) and the like, the content of the non-oxide ceramic particles containing V is more preferably in the range of 2.5 to 15.0 mass % relative to the resin coating film (total solid content of coating film).

(Doped Zinc Oxide Particles)

The resin coating film contains doped zinc oxide particles (that is, electrically conductive zinc oxide particles). Because the resin coating film contains doped zinc oxide particles that have electrical conductivity, the adhesion between the resin coating film and the electrodeposition coating film is enhanced. In addition, the weldability improves.

As an example of the doped zinc oxide particles, particles provided with electrical conductivity by doping zinc oxide particles with at least one type of element selected from the group consisting of the group 13 elements of the periodic table and the group 15 elements of the periodic table (hereinafter, may also be referred to as "dopant element") may be mentioned.

As examples of group 13 elements of the periodic table, B, Al, Ga and In may be mentioned. As examples of group 15 elements of the periodic table, P and As may be mentioned. Among these, Al or Ga is preferable as the dopant element from the viewpoint of improving electrical conductivity. In addition, from the viewpoint of cost, the dopant element is more preferably Al.

From the viewpoint of improving electrical conductivity, the content of the dopant element is preferably in the range of 0.05 to 5 atomic % relative to the undoped zinc oxide particles, and more preferably in the range of 0.1 to 5 atomic %.

The average particle diameter of the doped zinc oxide particles is preferably in the range of 0.2 to 5 µm, more preferably in the range of 0.3 to 4 µm, and further preferably in the range of 0.4 to 2.5 µm. When the average particle diameter of the doped zinc oxide particles is set in the range of 0.2 to 5 µm, the crystal of a chemical treatment film that is formed (for example, a crystal of an oxychloride such as a phosphate) is likely to grow in a wedge form, and the adhesion between the resin coating film and the electrodeposition coating film can be further improved by the anchor effect of the crystal of the chemical treatment film. Furthermore, the weldability also improves.

The definition and measurement method with respect to the "average particle diameter" of the doped zinc oxide particles are the same as the definition and measurement method with respect to the "average particle diameter" of the non-oxide ceramic particles containing V of the present embodiment.

The content of the doped zinc oxide particles is 10.0 mass % or more relative to the resin coating film (the total solid content of the coating film). If the content of the doped zinc oxide particles is less than 10.0 mass %, the component crystal of the chemical treatment film that is formed (for example, a crystal of an oxychloride such as a phosphate) is less likely to be formed within the outer layer of the resin coating film, and consequently it will be difficult to obtain adhesion between the resin coating film and the electrodeposition coating film by means of the anchor effect of the chemical treatment film, and an improvement in the weldability will not be obtained. On the other hand, the content of the doped zinc oxide particles is preferably not more than 45.0 mass % relative to the resin coating film (the total solid content of the coating film). If the content of the doped zinc oxide particles is more than 45.0 mass %, formation of the component crystal of the chemical treatment film that is formed will be saturated, and consequently the adhesion between the resin coating film and the electrodeposition coating film will be saturated and the ratios of the electrically conductive pigment and the anti-corrosive pigment existing in the coating film will decrease, and as a result the performance with respect to weldability and corrosion resistance before electrodeposition coating and the like may be insufficient. From the viewpoint of further enhancing the adhesion between the resin coating film and the electrodeposition coating film by means of the anchor effect of the crystal of the chemical treatment film, and also further enhancing the weldability, the content of the doped zinc oxide particles is more preferably within the range of 15.0 to 25.0 mass %.

An anti-corrosive pigment containing Mg that is described later may also be contained in the resin coating film, together with the doped zinc oxide particles. When the resin coating film contains doped zinc oxide particles and an anti-corrosive pigment containing Mg, the corrosion resistance before electrodeposition coating is further improved. It is presumed that the reason is that the doped zinc oxide and the Mg in the anti-corrosive pigment react and form insoluble composite oxides, and as a result the corrosion resistance before electrodeposition coating can be improved.

Examples of the anti-corrosive pigment containing Mg include magnesium-treated aluminum dihydrogen tripolyphosphate, magnesium ion-exchanged silica, and magnesium phosphate. Among these, from the viewpoint of improving the corrosion resistance before electrodeposition coating, magnesium-treated aluminum dihydrogen tripolyphosphate is preferable The content of the anti-corrosive pigment containing Mg when being used in combination with the doped zinc oxide particles is preferably in the range of 5.0 to 40.0 mass % relative to the resin coating film (the total solid content of the coating film). If the content of the anti-corrosive pigment containing Mg is less than 5.0 mass %, the advantageous effect of improving the corrosion resistance before electrodeposition coating by using the anti-corrosive pigment containing Mg in combination with the doped zinc oxide particles may not be obtained. On the other hand, if the content of the anti-corrosive pigment containing Mg is more than 40.0 mass %, the weldability may be insufficient due to the ratio that the electrically conductive pigment accounts for in the resin coating film decreasing. From the viewpoint of enhancing the corrosion resistance before electrodeposition coating, the content of the anti-corrosive pigment containing Mg when being used in combination with the doped zinc oxide particles is more preferably in the range of 10.0 to 30.0 mass %.

The content of the non-oxide ceramic particles containing V and the content of the doped zinc oxide particles relative to the coating film satisfy the following expressions:

$$C_{Zn} \geq 10.0 \quad (1)$$

$$C_V \leq 0.5 \cdot C_{Zn} \quad (2)$$

$$C_V \leq 70 - C_{Zn} \quad (3)$$

$$C_V \geq 0.125 \cdot C_{Zn} \quad (4)$$

$$C_V \geq 2.0 \quad (5)$$

Where, $C_V$ represents the content (mass %) of the non-oxide ceramic particles containing V, and $C_{Zn}$ represents the content (mass %) of the doped zinc oxide particles.

By the respective contents of the non-oxide ceramic particles containing V and the doped zinc oxide particles relative to the coating film satisfying the above expressions, the weldability of the coated steel sheet of the present embodiment can be further enhanced since adhesion to electrodes can be made favorable while also securing electrical conductivity.

(Anti-Corrosive Pigment)

An anti-corrosive pigment may be mentioned as an example of a preferable other component that is further contained in the resin coating film. When an anti-corrosive pigment is contained in the resin coating film in a state in which the non-oxide ceramic particles containing V of the present embodiment are contained in the resin coating film, the corrosion resistance before electrodeposition coating improves further.

Although the anti-corrosive pigment is not particularly limited, the anti-corrosive pigment is preferably at least one substance selected from the group consisting of aluminum tripolyphosphate, Zn, Mg, Al, Ti, Zr, and Ce salts of phosphoric acid and phosphorous acid, hydrocalumite-treated phosphoric acid compounds (as an example, Expert NP-530 N5, manufactured by Toho Ganryo Kogyo Co., Ltd., which is hydrocalumite-treated zinc phosphate), Ca ion-exchanged silica, and amorphous silica with an oil absorption of 100 to 1000 ml/100 g, a specific surface area of 200 to 1000 m²/g, and an average particle diameter of 2 to 30 μm.

Among these, from the viewpoint of achieving corrosion resistance of both a flawed portion and a flat surface portion, the anti-corrosive pigment is preferably a phosphate-based anti-corrosive pigment (aluminum tripolyphosphate, a hydrocalumite-treated phosphoric acid compound or the like) or a silica-based anti-corrosive pigment, or a combination of both of these. In particular, the anti-corrosive pigment is more preferably at least one type selected from the group consisting of aluminum tripolyphosphate, a hydrocalumite-treated phosphoric acid compound, Ca ion-exchange silica, and amorphous silica with an oil absorption of 100 to 1000 ml/100 g, a specific surface area of 200 to 1000 m²/g, and an average particle diameter of 2 to 30 μm.

Note that the oil absorption of silica can be measured in accordance with JIS K 5101-13-2. The specific surface area of silica can be measured by the BET method. The average particle diameter of silica can be measured by a method similar to the method for measuring the average particle diameter of the non-oxide ceramic particles containing V.

The content of the anti-corrosive pigment is preferably in the range of 5.0 to 40.0 mass % relative to the resin coating film (the total solid content of the coating film) If the content of the anti-corrosive pigment is less than 5 mass %, the advantageous effect of improving the corrosion resistance before electrodeposition coating may not be obtained. If the content of the anti-corrosive pigment is more than 40.0 mass %, the workability of the resin coating film may decrease, and a decrease in the cohesive force may also occur. In terms of the corrosion resistance before electrodeposition coating and the workability, the content of the anti-corrosive pigment is further preferably within the range of 10.0 to 30.0 mass % relative to the resin coating film (the total solid content of the coating film).

(Oxide Particles)

As examples of a preferable other component that is further contained in the resin coating film, at least one type of oxide particle selected from the group consisting of non-doped zinc oxide particles (that is, non-electrically conductive zinc oxide particles), magnesium oxide particles, calcium oxide particles, and strontium oxide particles may be mentioned. If the aforementioned oxide particles are contained in the resin coating film, the adhesion with the electrodeposition coating film after electrodeposition coating improves. The reason is presumed to be as follows. When a chemical treatment with an acidic chemical treatment solution is performed on the resin coating film containing the aforementioned oxide particles, oxide particles that are exposed on the surface of the resin coating film are dissolved by the acidic chemical treatment solution. Then, the pH in the vicinity of the dissolved oxide particles increases, and components of the chemical treatment solution (for example, an oxychloride such as a phosphate) precipitate and grow. Thus, a chemical treatment film is formed on the surface of the resin coating film. At this time, oxide particles that exist within the outer layer of the resin coating film are also dissolved by the acidic chemical treatment solution, and components of the chemical treatment solution precipitate within the outer layer of the resin coating film, and grow in a wedge form so as to protrude from the interior to the surface of the outer layer of the resin coating film. When an electrodeposition coating film is formed by coating on the chemical treatment film in this state, in addition to the high adhesion obtained by means of the chemical treatment film itself, the adhesion between the resin coating film and the electrodeposition coating film (in particular, the secondary adhesion after a warm salt water test) is further enhanced by the anchor effect of the crystal of the chemical treatment film that has grown in a wedge form (for example, a crystal of an oxychloride such as a phosphate).

From the viewpoint of enhancing adhesion between the resin coating film and the electrodeposition coating film, the oxide particles are preferably at least one type of particle selected from the group consisting of non-doped zinc oxide particles (that is, non-electrically conductive zinc oxide particles), magnesium oxide particles, calcium oxide particles and strontium oxide particles.

After being dissolved by the chemical treatment solution, the non-doped zinc oxide particles promote the growth of the crystal of the chemical treatment film (for example, a crystal of an oxychloride such as a phosphate); therefore, the adhesion between the resin coating film and the electrodeposition coating film can be further improved by the anchor effect of the crystal of the chemical treatment film.

After being dissolved by the chemical treatment solution, the non-doped zinc oxide particles, magnesium oxide particles, calcium oxide particles, and strontium oxide particles (in particular, the magnesium oxide particles and calcium oxide particles) are incorporated into the chemical treatment film. Therefore, a chemical treatment film that has Mg, Ca or Sr having corrosion resistance after electrodeposition coating is formed, and the corrosion resistance after electrodeposition coating can be improved.

The average particle diameter of the oxide particles is preferably in the range of 0.2 to 5 µm, more preferably in the range of 0.3 to 4 µm, and further preferably in the range of 0.4 to 2.5 µm. When the average particle diameter of the oxide particles is set in the range of 0.2 to 5 µm, the crystal of a chemical treatment film that is formed (for example, a crystal of an oxychloride such as a phosphate) is likely to grow in a wedge form, and the adhesion between the resin coating film and the electrodeposition coating film can be further improved by the anchor effect of the crystal of the chemical treatment film.

The definition and measurement method with respect to the "average particle diameter" of the oxide particles are the same as the definition and measurement method with respect to the "average particle diameter" of the non-oxide ceramic particles containing V of the present embodiment.

The content of the oxide particles is preferably in the range of 1.0 to 10.0 mass % relative to the resin coating film (the total solid content of the coating film). If the content of the oxide particles is less than 1.0 mass %, the component crystal of the chemical treatment film that is formed (for example, a crystal of an oxychloride such as a phosphate) is less likely to be formed within the outer layer of the resin coating film, and consequently it will be difficult to obtain adhesion between the resin coating film and the electrodeposition coating film by means of the anchor effect of the chemical treatment film. On the other hand, if the content of the oxide particles is more than 10.0 mass %, formation of the component crystal of the chemical treatment film that is formed will be saturated, and consequently the adhesion between the resin coating film and the electrodeposition coating film will be saturated and the ratios of the electrically conductive pigment and the anti-corrosive pigment existing in the resin coating film will decrease, and as a result the performance with respect to weldability and corrosion resistance before electrodeposition coating and the like may be insufficient. From the viewpoint of further enhancing the adhesion between the resin coating film and the electrodeposition coating film by means of the anchor effect of the crystal of the chemical treatment film, the content of the oxide particles is more preferably within the range of 2.5 to 7.5 mass %.

(Other Addition Agents)

The resin coating film may contain other addition agents, in addition to the aforementioned other components. Examples of the other addition agents include well-known addition agents such as an extender pigment, a solid lubricant, a corrosion inhibitor and a leveling agent.

Examples of the extender pigment include silica (including colloidal silica) or the like material.

When the resin coating film contains a solid lubricant, the solid lubricant can provide the resin coating film with excellent lubricity, and can improve the powdering resistance of the resin coating film. The solid lubricants of the following (1) to (2) may be mentioned as examples of the solid lubricants.

(1) Polyolefin wax and paraffin wax: for example, polyethylene wax, synthetic paraffin, natural paraffin, microcrystalline wax, a chlorinated hydrocarbon, and the like.

(2) Fluorine resin-based wax: for example, a polyfluoroethylene resin (a polytetrafluoroethylene resin, or the like), a polyvinyl fluoride resin, a polyvinylidene fluoride resin, and the like.

When using a polyethylene wax as the solid lubricant, the average particle diameter is preferably in the range of 0.5 to 10 If the average particle diameter of the polyethylene wax is less than 0.5 µm, the area occupied by the polyethylene wax in the outer layer of the resin coating film is liable to be large due to surface concentration of the polyethylene wax, and thus the adhesion between the resin coating film and the electrodeposition coating film may decrease. On the other hand, if the average particle diameter of the solid lubricant is more than 10 µm, the polyethylene wax is liable to fall off from the resin coating film, and a prescribed lubricity may be difficult to obtain and corrosion resistance after electrodeposition coating may be reduced. From the viewpoint of obtaining excellent adhesion between the resin coating film and the electrodeposition coating film, corrosion resistance after electrodeposition coating, lubricity and powdering resistance, the average particle diameter of the solid lubricant is more preferably within the range of 1 to 5 µm.

The softening point of the solid lubricant is preferably in the range of 100° C. to 135° C., and more preferably in the range of 110 to 130° C. When the softening point of the solid lubricant is in the range of 100° C. to 135° C., lubricity and powdering resistance of the resin coating film are further improved.

The content of the solid lubricant is preferably in the range of 0.1 to 10 mass % relative to the resin coating film (the total solid content of the coating film). If the content of the solid lubricant is less than 0.1 mass %, lubricity may not be sufficiently obtained. If the content of the solid lubricant is more than 10 mass %, the adhesion between the resin coating film and the electrodeposition coating film, and the corrosion resistance after electrodeposition coating may be reduced. From the viewpoint of the adhesion between the resin coating film and the electrodeposition coating film, the lubricity, and the corrosion resistance after electrodeposition coating, the content of the solid lubricant is more preferably within the range of 0.5 to 5 mass % relative to the resin coating film (the total solid content of the coating film), and further preferably is within the range of 0.5 to 2.5 mass %.

Examples of the corrosion inhibitor include an inorganic corrosion inhibitor and an organic corrosion inhibitor.

A water-soluble phosphate compound or the like may be mentioned as an example of the inorganic corrosion inhibitor. When a phosphate compound is contained in the resin coating film, similarly to a phosphate-based anti-corrosive pigment, rust preventive properties are enhanced by forming a phosphate coating film on the base metal surface. Examples of a water-soluble phosphate-based compound include phosphoric acids such as orthophosphoric acid, metaphosphatic acid, pyrophosphoric acid, triphosphoric acid and tetraphosphoric acid as well as the salts thereof, and phosphonic acids and the salts thereof.

Examples of the organic corrosion inhibitor include a guanidino group-containing compound, a biguanidino group-containing compound, and a thiocarbonyl group-containing compound. These compounds are easily adsorbed onto the metal surface, and therefore are effective for suppressing the occurrence of white rust on a galvanized steel sheet and the like.

The content of the corrosion inhibitor is preferably in the range of 0.5 to 5 mass % relative to the resin coating film (the total solid content of the coating film) If the content of the corrosion inhibitor is less than 0.5 mass %, the corrosion resistance may not be sufficiently improved. If the content of the corrosion inhibitor is more than 5 mass %, it may be difficult to form a coating because of a decrease in the stability of the solution. From the viewpoint of corrosion resistance and coating stability, the content of the corrosion inhibitor is more preferably in the range of 1 to 3 mass % relative to the resin coating film (the total solid content of the coating film).

(Coating mass of resin coating film) The coating mass of the resin coating film (the coating mass of the total solid content of the resin coating film) is preferably in the range of 1 to 25 $g/m^2$. If the coating mass of the resin coating film is less than 1 $g/m^2$, adhesion between the resin coating film and the electrodeposition coating film, and corrosion resistance before electrodeposition coating may not be sufficiently obtained. If the coating mass of the resin coating film is more than 25 $g/m^2$, weldability may not be sufficiently obtained due to a decrease in the cohesive force of the coating film. From the viewpoint of the adhesion between the resin coating film and the electrodeposition coating film, the weldability, and the corrosion resistance before electrodeposition coating, the coating mass of the resin coating film is more preferably 1.5 to 20 $g/m^2$, further preferably 2 to 20 $g/m^2$, and particularly preferably 2 to 15 $g/m^2$.

(Formation of Resin Coating Film)

The method for forming the resin coating film is not particularly limited, and a well-known method can be utilized. For example, a composition (coating) for resin coating film formation in which a binder resin, non-oxide ceramic particles containing V (excluding VC particles) and, as necessary, other components and other addition agents are mixed in a solvent is obtained. The solvent may be water or an organic solvent, but is preferably water from the viewpoint of production cost and environmental compatibility. That is, the composition for resin coating formation is preferably a water-based composition. The composition for resin coating formation is then applied onto at least one surface of a plated steel sheet, and drying and heating are performed to thereby form a resin coating film.

<Other Forms of Coated Steel Sheet>

In the coated steel sheet, a well-known functional film such as a pre-treatment film that further improves the adhesion of the resin coating film to the plated steel sheet and the corrosion resistance before electrodeposition coating or the like may be interposed between the plated steel sheet and the resin coating film.

A pre-treatment film containing practically no chromium (a chromate-free treatment coating film), and not a chromate treatment coating film, is preferable as the pre-treatment film. As examples of the chromate-free treatment liquid to be used for the chromate-free treatment, a silica-based treatment liquid containing a silicon compound such as liquid phase silica, gas phase silica, or a silicate as a main coating film component, and a zircon-based treatment liquid containing a zircon-based compound as a main coating film component may be mentioned. These treatment liquids may be liquids in which an organic resin is made to coexist with a main coating film component. Note that the chromate-free treatment liquid is not limited to a silica-based treatment liquid or a zircon-based treatment liquid. Apart from a silica-based treatment liquid and a zircon-based treatment liquid, various kinds of chromate-free treatment liquids for use in a coating preconditioning treatment have been proposed as a chromate-free treatment liquid. Further, chromate-free treatment liquids that are expected to be proposed in the future can also be used.

As the coating mass of the pre-treatment film, an appropriate coating mass may be selected in accordance with the treatment liquid that is used. For example, in the case of a pre-treatment film to be formed using a silica-based treatment liquid, a normal coating mass is preferably in the range of 1 to 20 $mg/m^2$ in terms of Si.

<Painted Member>

A painted member according to the present embodiment includes: a formed material composed of the coated steel sheet according to the present embodiment as described above and having the aforementioned coating film; and an electrodeposition coating film that is formed on the coating film.

The painted member according to the present embodiment is produced, for example, as follows. First, for example, a formed material having a target shape is obtained by subjecting the coated steel sheet to forming utilizing well-known forming techniques such as cutting and press-forming. As necessary, the formed material may be fashioned into a desired shape by welding (spot welding or the like).

Next, an electrodeposition coating is performed on the resin coating film of the formed material. By this means, an electrodeposition coating film is formed of the resin coating film. Although the electrodeposition coating may be either of an anionic electrodeposition coating and a cationic electrodeposition coating, a cationic electrodeposition coating is preferable from the viewpoint of corrosion resistance.

In particular, when an electrodeposition coating film is formed by a cationic electrodeposition coating that uses a water-based coating material that contains a resin [for example, an aqueous resin (a known aqueous resin such as an acrylic resin, a polyester resin, an alkyd resin, an epoxy resin or a polyurethane resin, or the like) having a hydrophilic group such as a carboxyl group, a hydroxyl group, a methylol group, an amino group, a sulfonate group, or a polyoxyethylene bond, and a functional group such as a hydroxyl group that reacts with a hardening agent], a hardening agent (melamine resin, blocked polyisocyanate or the like), and other addition agents (known addition agents such as a coloring pigment, an optical interference pigment, an extender pigment, a dispersing agent, an anti-settling agent, a reaction accelerator, an antifoaming agent, a thickening agent, a corrosion inhibitor, an ultraviolet absorbing agent and a surface conditioning agent), improvement of the adhesion between the resin coating film and the electrodeposition coating film is facilitated.

Thereafter, as necessary, another coating film such as an intermediate coating film or an overcoated coating may be formed on the electrodeposition coating film of the formed material.

The painted member according to the present embodiment is produced by performing these processes.

Note that, prior to forming an electrodeposition coating, a chemical treatment (for example, a phosphate treatment, a Zr treatment or the like) may be performed on the formed material on which the resin coating film is formed, after performing degreasing and surface conditioning. By performing a chemical treatment, although it is difficult to form a chemical treatment film on the resin coating film, a chemical treatment film is formed on required regions other than the resin coating film. Hence, the adhesion of the electrodeposition coating film can be enhanced with respect to the formed material (painted member) overall.

The painted member according to the present embodiment is widely utilized for uses such as automobile members (automobile body, suspension system members, or the like), machine members (casings or the like), home electrical appliance members (casings or the like), and building materials (roofs, walls, or the like).

EXAMPLES

The present invention will now be described more specifically using Examples. However, these Examples do not limit the present invention.

[Production of Coated Steel Sheet]

1. Preparation of Plated Steel Sheet

The following galvanized steel sheet GA etc. and the hot-dip Al coated steel sheet AL etc. were prepared, and each sheet was dipped in an aqueous solution at 40° C. of 2.5 mass % of a water-based alkaline degreasing agent (FC-301, produced by Nihon Parkerizing Co., Ltd.) for 2 minutes to degrease the surface, and then water washing and drying were performed to thereby obtain sheets for coating.

GA: an alloyed hot-dip galvanized steel sheet (steel thickness: 0.8 mm; 10 mass % Fe; coating mass of plating: 45 g/m$^2$)

EG: an electrogalvanized steel sheet (steel thickness: 0.8 mm; coating mass of plating: 40 g/m$^2$)

ZL: a Zn-10 mass % Ni alloy-electro plated steel sheet (steel thickness: 0.8 mm; coating mass of plating: 40 g/m$^2$)

GI: a hot-dip galvanized steel sheet (steel thickness: 0.8 mm; coating mass of plating: 60 g/m$^2$)

SD: a hot-dip Zn-11 mass % Al-3 mass % Mg-0.2 mass % Si alloy plated steel sheet (steel thickness: 0.8 mm; coating mass of plating: 60 g/m$^2$)

AL: a hot-dip Al plated steel sheet (steel thickness: 0.8 mm; coating mass of plating: 40 g/m$^2$)

2. Formation of Pre-Treatment Film

Next, the following two types of compositions for pre-treatment film formation were prepared, and the respective compositions were applied onto the plated steel sheets by bar coating so that the thickness of the coating film became 0.08 mm. The plated steel sheets on which the coating films were formed were dried in a hot-air oven at a metal surface peak temperature of 70° C., and thereafter were subjected to air drying to thereby form a pre-treatment film on the surface of each plated steel sheet.

P1: a water-based coating composition composed of a Zr compound, a silane coupling agent, and silica fine particles.

P2: a water-based coating composition composed of a polyester resin, silica fine particles, and a silane coupling agent.

3. Formation of Resin Coating Film

Next, in order to form the respective resin coating films of the compositions shown in Table 2 to Table 5, the components were mixed together so as to obtain the same solid content concentrations as those in Table 2 to Table 5, and thus a water-based composition for resin coating formation was prepared. The obtained water-based composition was applied onto the plated steel sheet with a bar coater in accordance with Table 6 to Table 9, and was dried using an oven under conditions for maintaining a maximum peak temperature of 140° C. for 8 seconds, to thereby form a resin coating film. The coating mass of the resin coating film was adjusted by means of dilution of the water-based composition and the count of the bar coater so that the total coating mass of the solid content (nonvolatile content) in the water-based composition became the mass indicated by the corresponding numerical value shown in Table 6 to Table 9. Note that, in Table 2 to Table 5 the solid content concentration of each component is written as the ratio (unit:mass %; the value per one surface) of the solid content (nonvolatile content) of each component relative to the solid content (nonvolatile content) of the entire water-based composition.

The details of the respective components (symbols) in Table 2 to Table 5 are as follows.

(A) Non-Oxide Ceramic Particles

VB$_2$: vanadium diboride particles (VB$_2$ particles) (average particle diameter: 1 to 3 μm, specific gravity=5.1 g/cm$^3$)

VB: vanadium monoboride particles (VB particles)

VC: vanadium-carbide particles (average particle diameter: 1 to 3 μm, specific gravity=5.8 g/cm$^3$)

VN: vanadium nitride particles (average particle diameter: 1 to 3 μm, specific gravity=6.1 g/cm$^3$)

TN: titanium nitride particles (average particle diameter: 1 to 3 μm, specific gravity=6 g/cm$^3$)

SUS: SUS particles (average particle diameter: 3 to 7 μm, specific gravity=7.7 g/cm$^3$)

(B) Anti-Corrosive Pigment

PA: aluminum tripolyphosphate (Zn coating) (condensed aluminum phosphate; K-105, manufactured by Tayca Corporation) (average particle diameter: 1 to 3 μm)

PM: magnesium phosphate (average particle diameter: 1 to 3 μm)
SC: calcium ion-exchanged silica (average particle diameter: 1 to 3 μm)
Si: silica (amorphous silica with an oil absorption of 100 to 1000 ml/100 g, a specific surface area of 200 to 1000 m$^2$/g, and an average particle diameter of 1 to 30 μm) (Sylomask 02, manufactured by Fuji Silysia Chemical Ltd.)
HP: hydrocalumite-treated zinc phosphate (Expert NP-530 N5, manufactured by Toho Ganryo Kogyo Co., Ltd.) (average particle diameter: 1 to 3 μm)
PMA: aluminum tripolyphosphate (Mg coating) (condensed aluminum phosphate; K-450H, manufactured by Tayca Corporation) (average particle diameter: 1 to 3 μm)

(C) Binder Resin

U1: a urethane-based resin emulsion (Superflex (registered trademark) E-2000, produced by DKS Co., Ltd.)
U2: a mixed resin obtained by blending a urethane-based resin emulsion (Superflex (registered trademark) E-2000, produced by DKS Co., Ltd.)+a silane coupling agent (silane coupling agent S510, produced by JNC Corporation) at a solid content ratio of 95:5
U3: a mixed resin obtained by blending a urethane-based resin emulsion (Superflex (registered trademark) E-2000, produced by DKS Co., Ltd.)+a silane coupling agent (silane coupling agent 5510, produced by JNC Corporation)+a zirconium compound (ammonium zirconium carbonate, produced by Kishida Chemical Co., Ltd.) at a solid content ratio of 90:5:5
P1: a polyester-based resin emulsion (Vylonal (registered trademark) MD1985, produced by Toyobo Co., Ltd.)
P2: a polyester-based resin emulsion (Vylonal (registered trademark) MD1245, produced by Toyobo Co., Ltd.)
P3: a mixed resin obtained by blending a polyester resin (Vylon (registered trademark) 290, produced by Toyobo Co., Ltd.)+melamine resin (an imino melamine resin; CYMEL 325, produced by Allnex Japan Inc.) at a solid content ratio of 80:20

(D) Oxide Particles

MgO: magnesium oxide particles (average particle diameter=1.0 μm)
CaO: calcium oxide particles (average particle diameter=1.0 μm)
ZnO(1): zinc oxide particles (average particle diameter=1.0 μm)
SrO: strontium oxide particles (average particle diameter=1.0 μm)
ZnO(2): doped zinc oxide particles (electrically conductive zinc oxide particles doped with aluminum, 23-Kt, produced by HakusuiTech Co., Ltd., average particle diameter=0.5 μm)

Note that, for the respective types of oxide particles mentioned above, the oxide particles were dispersed in water to which the resin had been added, pulverization was performed with a ball mill, and the resulting material was used. Regarding the average particle diameter of the oxide particles, the pulverization time was adjusted, and the average particle diameter in the resin coating film was measured.

(E) Other Addition Agents

WAX1: polyethylene wax (Chemipearl S650, manufactured by Mitsui Chemicals, Inc.) (average particle diameter=less than 0.1 μm)
WAX2: polyethylene wax (Chemipearl S120, manufactured by Mitsui Chemicals, Inc.) (average particle diameter=0.5 μm)
WAX3: polyethylene wax (Chemipearl W700, manufactured by Mitsui Chemicals, Inc.) (average particle diameter=1.0 μm)
WAX4: polyethylene wax (Chemipearl W400, manufactured by Mitsui Chemicals, Inc.) (average particle diameter=4.0 μm)
WAX5: polyethylene wax (Chemipearl W310, manufactured by Mitsui Chemicals, Inc.) (average particle diameter=9.5 μm)
CS: colloidal silica (silica sol ST-O, manufactured by Nissan Chemical Industries, Ltd.)

5. Production of Coated Steel Sheet

The pre-treatment film and the resin coating film were formed on the plated steel sheet in accordance with the description of Table 1 to Table 5 and the operating methods mentioned above to thereby produce the coated steel sheet of each sample number.

[Chemical Treatability Evaluation Test]

—Zinc Phosphate Treatment—

The coated steel sheet of each sample number was subjected to surface conditioning at room temperature for 20 seconds using a surface conditioning treatment agent, Prepalene X (product name) manufactured by Nihon Parkerizing Co., Ltd. Further, a zinc phosphate treatment was performed using a chemical treatment solution (zinc phosphate treatment liquid) "Palbond 3020 (product name)" manufactured by Nihon Parkerizing Co., Ltd. The coated steel sheet was dipped in the chemical treatment solution for 120 seconds, with the temperature of the chemical treatment solution set to 43° C., and then water washing and drying were performed.

—Zircon-Based Treatment (Zr Treatment)—

Instead of the aforementioned zinc phosphate treatment, the coated steel sheet of each sample number was subjected to a Zr treatment using an aqueous solution (hereunder, referred to as "FF chemical treatment solution") containing Zr ions and flouride, and also containing 100 to 1000 ppm of free fluoride ions.

To obtain a Zr treatment liquid, $H_2ZrF_6$ (hexafluorozirconate) was inserted into a container so as to be a prescribed metal concentration, and was diluted with ion exchanged water. Thereafter, an aqueous solution of sodium hydroxide and hydrofluoric acid was added into the container, and the solution was adjusted so that the fluoride concentration and free fluoride concentration in the solution became prescribed values. Measurement of the free fluoride concentration was performed using a commercially available concentration measurement instrument. After adjustment of the fluoride concentration and free fluoride concentration, the volume in the container was adjusted by addition of ion exchanged water to obtain a Zr treatment liquid (see Table 1 for the specific composition).

Next, a Zr treatment was performed in the following manner. First, as a pretreatment, the coated steel sheet was subjected to degreasing by immersion at 45° C. for 2 minutes using an alkaline degreasing agent (EC90, manufactured by Nippon Paint Co., Ltd.). Thereafter, the coated steel sheet was immersed for 120 seconds at 40° C. in the Zr treatment liquid shown in Table 1 to perform a chemical treatment. After the chemical treatment, the coated steel sheet was subjected to water washing and drying.

TABLE 1

| | Ions | | Free fluoride concentration [ppm] |
|---|---|---|---|
| Ion source | Concentration [ppm] | Fluoride concentration [ppm] | |
| $H_2ZrF_6$ | 5000 | 7000 | 300 |

[Corrosion Resistance Before Electrodeposition Coating Test]

A sample obtained by cutting the coated steel sheet prior to undergoing the aforementioned chemical treatment into predetermined size and sealing the end faces thereof was subjected to a corrosion resistance test using a corrosion resistance test method for plating based on JIS H 8502 (a corrosion resistance test method in which (1) salt water spraying (35° C., 2 h), (2) drying (60° C., 25% RH, 4 h), and (3) wetting (50° C., 98% RH, 2 h) are performed in sequence), and the occurrence of corrosion from a flat surface portion was observed. For the testing time, the aforementioned (1) to (3) was taken as a single cycle, and the quality of the corrosion resistance before electrodeposition coating was evaluated using the following evaluation scores based on the flat surface portion corrosion area ratio at the time point of 60 cycles. A coated steel sheet that received an evaluation score of 3 or higher was assessed as being excellent in the pre-electrodeposition coating test.

6: corrosion area ratio is 2.5% or less
5: corrosion area ratio is more than 2.5% and not more than 5%
4: corrosion area ratio is more than 5% and not more than 10%
3: corrosion area ratio is more than 10% and not more than 20%
2: corrosion area ratio is more than 20% and not more than 50%
1: corrosion area ratio is more than 50%

[Weldability Test (Contact Resistivity)]

The contact resistance value of the coated steel sheet before performing the chemical treatment mentioned above was calculated by measuring a voltage value when pressurizing the steel sheet using a constant-current generator with an applied pressure of 1.96 kN, a welding current of 2 A, and a voltage of 10V, by using R40 CF type Cr—Cu electrodes having a tip with a diameter of 5 mm. The quality of spot weldability was evaluated using the following evaluation scores. When the spot weldability received an evaluation score of 3 or higher, the relevant coated steel sheet was assessed as being excellent in spot weldability.

4: less than 10 mΩ
3: 10 mΩ or more and less than 50 mΩ
2: 50 mΩ or more and less than 100 mΩ
1: more than 100 mΩ

[Weldability Test (Continuous Spotting Properties)]

The coated steel sheet before performing the chemical treatment mentioned above was subjected to a continuous spotting properties test, using R40 CF type Cr—Cu electrodes having a tip with a diameter of 5 mm, at an applied pressure of 1.96 kN, a welding current of 8 kA, and a welding time of 12 cycles/50 Hz; and the number of welds at the time immediately before the nugget diameter became less than $3\sqrt{t}$ (t represents the steel thickness) was found. The quality of the spot weldability was evaluated using the following evaluation scores. When the spot weldability received an evaluation score of 3 or higher, the relevant coated steel sheet was assessed as being excellent in spot weldability.

4: the number of welds was 1500 or more
3: the number of welds was more than 1000 and less than 1500
2: the number of welds was more than 200 and less than 1000
1: the number of welds was less than 200

[Coating Film Adhesion Test]

After performing a zinc phosphate treatment or a Zr treatment as the chemical treatment mentioned above, the coated steel sheet was coated with a cationic electrodeposition coating material manufactured by Nippon Paint Co., Ltd. by electrodeposition with a slope control energization at a voltage of 160 V, and baking coating was performed at a baking temperature of 170° C. for 20 minutes. The average of the film thickness of the electrodeposition coating film after electrodeposition coating was 8 μm for all the test numbers. After the electrodeposition coating mentioned above, the coated steel sheet was immersed in a 5% NaCl aqueous solution having a temperature of 50° C. for 500 hours. After the immersion, a polyester tape was adhered to the whole of an area of 60 mm×120 mm (area A10=60 mm×120 mm=7200 mm$^2$) of the test surface. Thereafter, the tape was ripped off. The area A2 (mm$^2$) of the peeled-off electrodeposition coating film as a result of ripping off the tape was determined, and the rate of peeling of the coating film (%) was found based on the following formula.

Formula: rate of peeling of coating film=$(A2/A10)\times 100$

The quality of the coating film adhesion was evaluated using the following evaluation scores. A coated steel sheet that received an evaluation score of 3 or higher in the coating film adhesion evaluation test was assessed as being excellent in coating film adhesion.

5: rate of peeling of coating film is less than 5%
4: rate of peeling of coating film is 5% or more and less than 10%
3: rate of peeling of coating film is 10% or more and less than 20%
2: rate of peeling of coating film is 20% or more and less than 40%
1: rate of peeling of coating film is 40% or more

[Corrosion Resistance Test after Electrodeposition Coating]

After performing a zinc phosphate treatment as the chemical treatment mentioned above, the coated steel sheet was coated with a cationic electrodeposition coating material manufactured by Nippon Paint Co., Ltd. by electrodeposition with a slope control energization at a voltage of 160 V, and baking coating was performed at a baking temperature of 170° C. for 20 minutes. The average of the film thickness of the electrodeposition coating film after electrodeposition coating was 8 μm for all the test numbers. After the electrodeposition coating mentioned above was performed, a sample in which a cut was inserted with a cutter knife (load: 500 gf; 1 gf being approximately $9.8\times10^{-3}$ N) into the coating on a face to be evaluated was subjected to a corrosion resistance test using a corrosion resistance test method for plating based on JIS H 8502 (a corrosion resistance test method in which (1) salt water spraying (35° C., 2 h), (2) drying (60° C., 25% RH, 4 h), and (3) wetting (50° C., 98% RH, 2 h) are performed in sequence), and the width of blistering of the coating film occurring at the cut portion was observed. Regarding the testing time, taking the aforementioned (1) to (3) as a single cycle, based on the width of blistering of the coating film from the cut portion at the time point of 240 cycles, the quality of the corrosion resistance after electrodeposition coating was evaluated using the following evaluation scores. A coated steel sheet that received an evaluation score of 3 or higher in the corrosion resistance after electrodeposition coating test was assessed as being excellent in corrosion resistance after electrodeposition coating.

6: very extremely minute coating blistering of less than 0.5 mm

5: extremely minute coating blistering of 0.5 mm or more and less than 1.0 mm

4: minute coating blistering of 1.0 mm or more and less than 1.5 mm

3: coating blistering of 1.5 mm or more and less than 2.0 mm

2: coating blistering of 2.0 mm or more and less than 3.0 mm

1: coating blistering of 3.0 mm or more

The details of the Examples are listed hereunder in Table 2 to Table 9.

TABLE 2

| Water-based composition no. | A Non-oxide ceramic particles | | B Anti-corrosive pigment 1 | | B Anti-corrosive pigment 2 | | C Binder resin | | D Oxide particles (ZnO(2)) | |
|---|---|---|---|---|---|---|---|---|---|---|
| | Type | Concentration (mass %) | Type | Concentration (mass %) | Type | Concentration (mass %) | Type | Concentration (mass %) | Type | Concentration (mass %) |
| 1 | — | — | — | — | — | — | U1 | 100.0 | — | — |
| 2 | — | — | — | — | — | — | U1 | 90.0 | ZnO(2) | 10.0 |
| 3 | VB$_2$ | 1.0 | — | — | — | — | U1 | 89.0 | ZnO(2) | 10.0 |
| 4 | VB$_2$ | 1.0 | — | — | — | — | U1 | 97.0 | ZnO(2) | 2.0 |
| 5 | VB$_2$ | 1.0 | — | — | — | — | U1 | 30.0 | ZnO(2) | 69.0 |
| 6 | VB$_2$ | 1.0 | — | — | — | — | U1 | 91.0 | ZnO(2) | 8.0 |
| 7 | VB$_2$ | 2.0 | — | — | — | — | U1 | 78.0 | ZnO(2) | 15.0 |
| 8 | VB$_2$ | 2.5 | — | — | — | — | U1 | 97.5 | — | — |
| 9 | VB$_2$ | 2.5 | — | — | — | — | U1 | 92.5 | ZnO(2) | 5.0 |
| 10 | VB$_2$ | 2.5 | — | — | — | — | U1 | 87.5 | ZnO(2) | 10.0 |
| 11 | VB$_2$ | 2.5 | — | — | — | — | U1 | 82.5 | ZnO(2) | 15.0 |
| 12 | VB$_2$ | 2.5 | — | — | — | — | U1 | 77.5 | ZnO(2) | 20.0 |
| 13 | VB$_2$ | 2.5 | — | — | — | — | U1 | 72.5 | ZnO(2) | 25.0 |
| 14 | VB$_2$ | 2.5 | — | — | — | — | U1 | 30.0 | ZnO(2) | 67.5 |
| 15 | VB$_2$ | 5.0 | — | — | — | — | U1 | 85.0 | ZnO(2) | 10.0 |
| 16 | VB$_2$ | 5.0 | — | — | — | — | U1 | 80.0 | ZnO(2) | 15.0 |
| 17 | VB$_2$ | 5.0 | — | — | — | — | U1 | 75.0 | ZnO(2) | 20.0 |
| 18 | VB$_2$ | 5.0 | — | — | — | — | U1 | 70.0 | ZnO(2) | 25.0 |
| 19 | VB$_2$ | 5.0 | — | — | — | — | U1 | 55.0 | ZnO(2) | 40.0 |
| 20 | VB$_2$ | 5.0 | — | — | — | — | U1 | 30.0 | ZnO(2) | 65.0 |
| 21 | VB$_2$ | 7.5 | — | — | — | — | U1 | 82.5 | ZnO(2) | 10.0 |
| 22 | VB$_2$ | 7.5 | — | — | — | — | U1 | 77.5 | ZnO(2) | 15.0 |
| 23 | VB$_2$ | 7.5 | — | — | — | — | U1 | 72.5 | ZnO(2) | 20.0 |
| 24 | VB$_2$ | 7.5 | — | — | — | — | U1 | 67.5 | ZnO(2) | 25.0 |
| 25 | VB$_2$ | 7.5 | — | — | — | — | U1 | 32.5 | ZnO(2) | 60.0 |
| 26 | VB$_2$ | 7.5 | — | — | — | — | U1 | 30.0 | ZnO(2) | 62.5 |
| 27 | VB$_2$ | 10.0 | — | — | — | — | U1 | 80.0 | ZnO(2) | 10.0 |
| 28 | VB$_2$ | 10.0 | — | — | — | — | U1 | 70.0 | ZnO(2) | 20.0 |
| 29 | VB$_2$ | 10.0 | — | — | — | — | U1 | 60.0 | ZnO(2) | 30.0 |
| 30 | VB$_2$ | 10.0 | — | — | — | — | U1 | 50.0 | ZnO(2) | 40.0 |
| 31 | VB$_2$ | 10.0 | — | — | — | — | U1 | 30.0 | ZnO(2) | 60.0 |
| 32 | VB$_2$ | 10.0 | — | — | — | — | U1 | 10.0 | ZnO(2) | 80.0 |
| 33 | VB$_2$ | 20.0 | — | — | — | — | U1 | 40.0 | ZnO(2) | 40.0 |
| 34 | VB$_2$ | 20.0 | — | — | — | — | U1 | 30.0 | ZnO(2) | 50.0 |
| 35 | VB$_2$ | 22.5 | — | — | — | — | U1 | 32.5 | ZnO(2) | 45.0 |
| 36 | VB$_2$ | 22.5 | — | — | — | — | U1 | 30.0 | ZnO(2) | 47.5 |
| 37 | VB$_2$ | 25.0 | — | — | — | — | U1 | 30.0 | ZnO(2) | 45.0 |
| 38 | VB$_2$ | 25.0 | — | — | — | — | U1 | 25.0 | ZnO(2) | 50.0 |
| 39 | VB$_2$ | 30.0 | — | — | — | — | U1 | 60.0 | ZnO(2) | 10.0 |

| Water-based composition no. | D Oxide particles (other than ZnO(2)) | | E Other addition agents | | Expression (2) right side | Expression (3) right side | Expression (4) right side | Remarks |
|---|---|---|---|---|---|---|---|---|
| | Type | Concentration (mass %) | Type | Concentration (mass %) | | | | |
| 1 | — | — | — | — | — | — | — | Comp. Ex. |
| 2 | — | — | — | — | 5.0 | 60.0 | 1.3 | Comp. Ex. |
| 3 | — | — | — | — | 5.0 | 60.0 | 1.3 | Comp. Ex. |
| 4 | — | — | — | — | 1.0 | 68.0 | 0.3 | Comp. Ex. |
| 5 | — | — | — | — | 34.5 | 1.0 | 8.6 | Comp. Ex. |
| 6 | — | — | — | — | 4.0 | 62.0 | 1.0 | Comp. Ex. |
| 7 | — | — | — | — | 10.0 | 50.0 | 2.5 | Example |
| 8 | — | — | — | — | — | — | — | Comp. Ex. |
| 9 | — | — | — | — | 2.5 | 65.0 | 0.6 | Comp. Ex. |
| 10 | — | — | — | — | 5.0 | 60.0 | 1.3 | Example |
| 11 | — | — | — | — | 7.5 | 55.0 | 1.9 | Example |

TABLE 2-continued

| | | | | | | | | |
|---|---|---|---|---|---|---|---|---|
| 12 | — | — | — | — | 10.0 | 50.0 | 2.5 | Example |
| 13 | — | — | — | — | 12.5 | 45.0 | 3.1 | Comp. Ex. |
| 14 | — | — | — | — | 33.8 | 2.5 | 8.4 | Comp. Ex. |
| 15 | — | — | — | — | 5.0 | 60.0 | 1.3 | Example |
| 16 | — | — | — | — | 7.5 | 55.0 | 1.9 | Example |
| 17 | — | — | — | — | 10.0 | 50.0 | 2.5 | Example |
| 18 | — | — | — | — | 12.5 | 45.0 | 3.1 | Example |
| 19 | — | — | — | — | 20.0 | 30.0 | 5.0 | Example |
| 20 | — | — | — | — | 32.5 | 5.0 | 8.1 | Comp. Ex. |
| 21 | — | — | — | — | 5.0 | 60.0 | 1.3 | Comp. Ex. |
| 22 | — | — | — | — | 7.5 | 55.0 | 1.9 | Example |
| 23 | — | — | — | — | 10.0 | 50.0 | 2.5 | Example |
| 24 | — | — | — | — | 12.5 | 45.0 | 3.1 | Example |
| 25 | — | — | — | — | 30.0 | 10.0 | 7.5 | Example |
| 26 | — | — | — | — | 31.3 | 7.5 | 7.8 | Comp. Ex. |
| 27 | — | — | — | — | 5.0 | 60.0 | 1.3 | Comp. Ex. |
| 28 | — | — | — | — | 10.0 | 50.0 | 2.5 | Example |
| 29 | — | — | — | — | 15.0 | 40.0 | 3.8 | Example |
| 30 | — | — | — | — | 20.0 | 30.0 | 5.0 | Example |
| 31 | — | — | — | — | 30.0 | 10.0 | 7.5 | Example |
| 32 | — | — | — | — | 40.0 | −10.0 | 10.0 | Comp. Ex. |
| 33 | — | — | — | — | 20.0 | 30.0 | 5.0 | Example |
| 34 | — | — | — | — | 25.0 | 20.0 | 6.3 | Example |
| 35 | — | — | — | — | 22.5 | 25.0 | 5.6 | Example |
| 36 | — | — | — | — | 23.8 | 22.5 | 5.9 | Example |
| 37 | — | — | — | — | 22.5 | 25.0 | 5.6 | Comp. Ex. |
| 38 | — | — | — | — | 25.0 | 20.0 | 6.3 | Comp. Ex. |
| 39 | — | — | — | — | 5.0 | 60.0 | 1.3 | Comp. Ex. |

TABLE 3

| Water-based composition no. | A Non-oxide ceramic particles | | B Anti-corrosive pigment 1 | | Anti-corrosive pigment 2 | | C Binder resin | | D Oxide particles (ZnO(2)) | |
|---|---|---|---|---|---|---|---|---|---|---|
| | Type | Concentration (mass %) | Type | Concentration (mass %) | Type | Concentration (mass %) | Type | Concentration (mass %) | Type | Concentration (mass %) |
| 40 | VN | 2.5 | — | — | — | — | U1 | 82.5 | ZnO(2) | 15.0 |
| 41 | VN | 2.5 | — | — | — | — | U1 | 77.5 | ZnO(2) | 20.0 |
| 42 | VN | 5.0 | — | — | — | — | U1 | 80.0 | ZnO(2) | 15.0 |
| 43 | VN | 5.0 | — | — | — | — | U1 | 75.0 | ZnO(2) | 20.0 |
| 44 | VN | 5.0 | — | — | — | — | U1 | 70.0 | ZnO(2) | 25.0 |
| 45 | VN | 7.5 | — | — | — | — | U1 | 77.5 | ZnO(2) | 15.0 |
| 46 | VN | 7.5 | — | — | — | — | U1 | 72.5 | ZnO(2) | 20.0 |
| 47 | VN | 7.5 | — | — | — | — | U1 | 67.5 | ZnO(2) | 25.0 |
| 48 | VN | 10.0 | — | — | — | — | U1 | 70.0 | ZnO(2) | 20.0 |
| 49 | VN | 10.0 | — | — | — | — | U1 | 60.0 | ZnO(2) | 30.0 |
| 50 | VB | 2.5 | — | — | — | — | U1 | 77.5 | ZnO(2) | 20.0 |
| 51 | VB | 5.0 | — | — | — | — | U1 | 75.0 | ZnO(2) | 20.0 |
| 52 | VB | 7.5 | — | — | — | — | U1 | 67.5 | ZnO(2) | 25.0 |
| 53 | VB | 10.0 | — | — | — | — | U1 | 60.0 | ZnO(2) | 30.0 |
| 54 | $VB_2$ | 2.5 | — | — | — | — | P1 | 77.5 | ZnO(2) | 20.0 |
| 55 | $VB_2$ | 5.0 | — | — | — | — | P1 | 75.0 | ZnO(2) | 20.0 |
| 56 | $VB_2$ | 7.5 | — | — | — | — | P1 | 67.5 | ZnO(2) | 25.0 |
| 57 | $VB_2$ | 10.0 | — | — | — | — | P1 | 60.0 | ZnO(2) | 30.0 |
| 58 | $VB_2$ | 2.5 | — | — | — | — | P2 | 77.5 | ZnO(2) | 20.0 |
| 59 | $VB_2$ | 5.0 | — | — | — | — | P2 | 75.0 | ZnO(2) | 20.0 |
| 60 | $VB_2$ | 7.5 | — | — | — | — | P2 | 67.5 | ZnO(2) | 25.0 |
| 61 | $VB_2$ | 10.0 | — | — | — | — | P2 | 60.0 | ZnO(2) | 30.0 |
| 62 | $VB_2$ | 2.5 | — | — | — | — | P3 | 77.5 | ZnO(2) | 20.0 |
| 63 | $VB_2$ | 5.0 | — | — | — | — | P3 | 75.0 | ZnO(2) | 20.0 |
| 64 | $VB_2$ | 7.5 | — | — | — | — | P3 | 67.5 | ZnO(2) | 25.0 |
| 65 | $VB_2$ | 10.0 | — | — | — | — | P3 | 60.0 | ZnO(2) | 30.0 |
| 66 | VC | 2.5 | — | — | — | — | U1 | 77.5 | ZnO(2) | 20.0 |
| 67 | TN | 2.5 | — | — | — | — | U1 | 77.5 | ZnO(2) | 20.0 |
| 68 | SUS | 2.5 | — | — | — | — | U1 | 77.5 | ZnO(2) | 20.0 |

TABLE 3-continued

| Water-based composition no. | D Oxide particles (other than ZnO(2)) Type | Concentration (mass %) | E Other addition agents Type | Concentration (mass %) | Expression (2) right side | Expression (3) right side | Expression (4) right side | Remarks |
|---|---|---|---|---|---|---|---|---|
| 40 | — | — | — | — | 7.5 | 55.0 | 1.9 | Example |
| 41 | — | — | — | — | 10.0 | 50.0 | 2.5 | Example |
| 42 | — | — | — | — | 7.5 | 55.0 | 1.9 | Example |
| 43 | — | — | — | — | 10.0 | 50.0 | 2.5 | Example |
| 44 | — | — | — | — | 12.5 | 45.0 | 3.1 | Example |
| 45 | — | — | — | — | 7.5 | 55.0 | 1.9 | Example |
| 46 | — | — | — | — | 10.0 | 50.0 | 2.5 | Example |
| 47 | — | — | — | — | 12.5 | 45.0 | 3.1 | Example |
| 48 | — | — | — | — | 10.0 | 50.0 | 2.5 | Example |
| 49 | — | — | — | — | 15.0 | 40.0 | 3.8 | Example |
| 50 | — | — | — | — | 10.0 | 50.0 | 2.5 | Example |
| 51 | — | — | — | — | 10.0 | 50.0 | 2.5 | Example |
| 52 | — | — | — | — | 12.5 | 45.0 | 3.1 | Example |
| 53 | — | — | — | — | 15.0 | 40.0 | 3.8 | Example |
| 54 | — | — | — | — | 10.0 | 50.0 | 2.5 | Example |
| 55 | — | — | — | — | 10.0 | 50.0 | 2.5 | Example |
| 56 | — | — | — | — | 12.5 | 45.0 | 3.1 | Example |
| 57 | — | — | — | — | 15.0 | 40.0 | 3.8 | Example |
| 58 | — | — | — | — | 10.0 | 50.0 | 2.5 | Example |
| 59 | — | — | — | — | 10.0 | 50.0 | 2.5 | Example |
| 60 | — | — | — | — | 12.5 | 45.0 | 3.1 | Example |
| 61 | — | — | — | — | 15.0 | 40.0 | 3.8 | Example |
| 62 | — | — | — | — | 10.0 | 50.0 | 2.5 | Example |
| 63 | — | — | — | — | 10.0 | 50.0 | 2.5 | Example |
| 64 | — | — | — | — | 12.5 | 45.0 | 3.1 | Example |
| 65 | — | — | — | — | 15.0 | 40.0 | 3.8 | Example |
| 66 | — | — | — | — | 10.0 | 50.0 | 2.5 | Comp. Ex. |
| 67 | — | — | — | — | 10.0 | 50.0 | 2.5 | Comp. Ex. |
| 68 | — | — | — | — | 10.0 | 50.0 | 2.5 | Comp. Ex. |

TABLE 4

| Water-based composition no. | A Non-oxide ceramic particles Type | Concentration (mass %) | B Anti-corrosive pigment 1 Type | Concentration (mass %) | Anti-corrosive pigment 2 Type | Concentration (mass %) | C Binder resin Type | Concentration (mass %) | D Oxide particles (ZnO(2)) Type | Concentration (mass %) |
|---|---|---|---|---|---|---|---|---|---|---|
| 69 | $VB_2$ | 2.5 | PA | 20 | — | — | U1 | 62.5 | ZnO(2) | 15.0 |
| 70 | $VB_2$ | 2.5 | PM | 20 | — | — | U1 | 62.5 | ZnO(2) | 15.0 |
| 71 | $VB_2$ | 2.5 | SC | 20 | — | — | U1 | 62.5 | ZnO(2) | 15.0 |
| 72 | $VB_2$ | 2.5 | Si | 20 | — | — | U1 | 62.5 | ZnO(2) | 15.0 |
| 73 | $VB_2$ | 2.5 | HP | 20 | — | — | U1 | 62.5 | ZnO(2) | 15.0 |
| 74 | $VB_2$ | 2.5 | PMA | 20 | — | — | U1 | 62.5 | ZnO(2) | 15.0 |
| 75 | $VB_2$ | 2.5 | Si | 5 | PMA | 25 | U1 | 52.5 | ZnO(2) | 15.0 |
| 76 | $VB_2$ | 5.0 | PA | 20 | — | — | U1 | 55.0 | ZnO(2) | 20.0 |
| 77 | $VB_2$ | 5.0 | PM | 20 | — | — | U1 | 55.0 | ZnO(2) | 20.0 |
| 78 | $VB_2$ | 5.0 | SC | 20 | — | — | U1 | 55.0 | ZnO(2) | 20.0 |
| 79 | $VB_2$ | 5.0 | Si | 20 | — | — | U1 | 55.0 | ZnO(2) | 20.0 |
| 80 | $VB_2$ | 5.0 | HP | 20 | — | — | U1 | 55.0 | ZnO(2) | 20.0 |
| 81 | $VB_2$ | 5.0 | PMA | 20 | — | — | U1 | 55.0 | ZnO(2) | 20.0 |
| 82 | $VB_2$ | 5.0 | Si | 5 | PMA | 25 | U1 | 45.0 | ZnO(2) | 20.0 |
| 83 | $VB_2$ | 7.5 | PA | 20 | — | — | U1 | 47.5 | ZnO(2) | 25.0 |
| 84 | $VB_2$ | 7.5 | PM | 20 | — | — | U1 | 47.5 | ZnO(2) | 25.0 |
| 85 | $VB_2$ | 7.5 | SC | 20 | — | — | U1 | 47.5 | ZnO(2) | 25.0 |
| 86 | $VB_2$ | 7.5 | Si | 20 | — | — | U1 | 47.5 | ZnO(2) | 25.0 |
| 87 | $VB_2$ | 7.5 | HP | 20 | — | — | U1 | 47.5 | ZnO(2) | 25.0 |
| 88 | $VB_2$ | 7.5 | PMA | 20 | — | — | U1 | 47.5 | ZnO(2) | 25.0 |
| 89 | $VB_2$ | 7.5 | Si | 5 | PMA | 25 | U1 | 37.5 | ZnO(2) | 25.0 |
| 90 | VN | 5.0 | Si | 20 | — | — | U1 | 55.0 | ZnO(2) | 20.0 |
| 91 | VN | 5.0 | PMA | 20 | — | — | U1 | 55.0 | ZnO(2) | 20.0 |
| 92 | VN | 5.0 | Si | 5 | PMA | 25 | U1 | 45.0 | ZnO(2) | 20.0 |
| 93 | $VB_2$ | 5.0 | Si | 1 | — | — | U1 | 74.0 | ZnO(2) | 20.0 |
| 94 | $VB_2$ | 5.0 | Si | 5 | — | — | U1 | 70.0 | ZnO(2) | 20.0 |
| 95 | $VB_2$ | 5.0 | Si | 10 | — | — | U1 | 65.0 | ZnO(2) | 20.0 |
| 96 | $VB_2$ | 5.0 | Si | 30 | — | — | U1 | 45.0 | ZnO(2) | 20.0 |
| 97 | $VB_2$ | 5.0 | PMA | 1 | — | — | U1 | 74.0 | ZnO(2) | 20.0 |

TABLE 4-continued

| | | | | | | | | | |
|---|---|---|---|---|---|---|---|---|---|
| 98 | VB$_2$ | 5.0 | PMA | 5 | — | — | U1 | 70.0 | ZnO(2) | 20.0 |
| 99 | VB$_2$ | 5.0 | PMA | 10 | — | — | U1 | 65.0 | ZnO(2) | 20.0 |
| 100 | VB$_2$ | 5.0 | PMA | 30 | — | — | U1 | 45.0 | ZnO(2) | 20.0 |

| | D Oxide particles (other than ZnO(2)) | | E Other addition agents | | Expression | | | |
|---|---|---|---|---|---|---|---|---|
| Water-based composition no. | Type | Concentration (mass %) | Type | Concentration (mass %) | Expression (2) right side | Expression (3) right side | Expression (4) right side | Remarks |
| 69 | — | — | — | — | 7.5 | 55.0 | 1.9 | Example |
| 70 | — | — | — | — | 7.5 | 55.0 | 1.9 | Example |
| 71 | — | — | — | — | 7.5 | 55.0 | 1.9 | Example |
| 72 | — | — | — | — | 7.5 | 55.0 | 1.9 | Example |
| 73 | — | — | — | — | 7.5 | 55.0 | 1.9 | Example |
| 74 | — | — | — | — | 7.5 | 55.0 | 1.9 | Example |
| 75 | — | — | — | — | 7.5 | 55.0 | 1.9 | Example |
| 76 | — | — | — | — | 10.0 | 50.0 | 2.5 | Example |
| 77 | — | — | — | — | 10.0 | 50.0 | 2.5 | Example |
| 78 | — | — | — | — | 10.0 | 50.0 | 2.5 | Example |
| 79 | — | — | — | — | 10.0 | 50.0 | 2.5 | Example |
| 80 | — | — | — | — | 10.0 | 50.0 | 2.5 | Example |
| 81 | — | — | — | — | 10.0 | 50.0 | 2.5 | Example |
| 82 | — | — | — | — | 10.0 | 50.0 | 2.5 | Example |
| 83 | — | — | — | — | 12.5 | 45.0 | 3.1 | Example |
| 84 | — | — | — | — | 12.5 | 45.0 | 3.1 | Example |
| 85 | — | — | — | — | 12.5 | 45.0 | 3.1 | Example |
| 86 | — | — | — | — | 12.5 | 45.0 | 3.1 | Example |
| 87 | — | — | — | — | 12.5 | 45.0 | 3.1 | Example |
| 88 | — | — | — | — | 12.5 | 45.0 | 3.1 | Example |
| 89 | — | — | — | — | 12.5 | 45.0 | 3.1 | Example |
| 90 | — | — | — | — | 10.0 | 50.0 | 2.5 | Example |
| 91 | — | — | — | — | 10.0 | 50.0 | 2.5 | Example |
| 92 | — | — | — | — | 10.0 | 50.0 | 2.5 | Example |
| 93 | — | — | — | — | 10.0 | 50.0 | 2.5 | Example |
| 94 | — | — | — | — | 10.0 | 50.0 | 2.5 | Example |
| 95 | — | — | — | — | 10.0 | 50.0 | 2.5 | Example |
| 96 | — | — | — | — | 10.0 | 50.0 | 2.5 | Example |
| 97 | — | — | — | — | 10.0 | 50.0 | 2.5 | Example |
| 98 | — | — | — | — | 10.0 | 50.0 | 2.5 | Example |
| 99 | — | — | — | — | 10.0 | 50.0 | 2.5 | Example |
| 100 | — | — | — | — | 10.0 | 50.0 | 2.5 | Example |

TABLE 5

| | A | B | | | | C | | D | |
|---|---|---|---|---|---|---|---|---|---|
| | Non-oxide ceramic particles | Anti-corrosive pigment 1 | | Anti-corrosive pigment 2 | | Binder resin | | Oxide particles (ZnO(2)) | |
| Water-based composition no. | Type | Concentration (mass %) | Type | Concentration (mass %) | Type | Concentration (mass %) | Type | Concentration (mass %) | Type | Concentration (mass %) |
| 101 | VB$_2$ | 5.0 | — | — | — | — | U1 | 70.0 | ZnO(2) | 20.0 |
| 102 | VB$_2$ | 5.0 | — | — | — | — | U1 | 70.0 | ZnO(2) | 20.0 |
| 103 | VB$_2$ | 5.0 | — | — | — | — | U1 | 70.0 | ZnO(2) | 20.0 |
| 104 | VB$_2$ | 5.0 | — | — | — | — | U1 | 70.0 | ZnO(2) | 20.0 |
| 105 | VB$_2$ | 5.0 | — | — | — | — | U1 | 74.5 | ZnO(2) | 20.0 |
| 106 | VB$_2$ | 5.0 | — | — | — | — | U1 | 74.0 | ZnO(2) | 20.0 |
| 107 | VB$_2$ | 5.0 | — | — | — | — | U1 | 65.0 | ZnO(2) | 20.0 |
| 108 | VB$_2$ | 5.0 | Si | 20 | — | — | U1 | 50.0 | ZnO(2) | 20.0 |
| 109 | VB$_2$ | 5.0 | Si | 5 | PMA | 25 | U1 | 40.0 | ZnO(2) | 20.0 |
| 110 | VN | 5.0 | — | — | — | — | U1 | 70.0 | ZnO(2) | 20.0 |
| 111 | VN | 5.0 | Si | 20 | — | — | U1 | 50.0 | ZnO(2) | 20.0 |
| 112 | VN | 5.0 | Si | 5 | PMA | 25 | U1 | 40.0 | ZnO(2) | 20.0 |
| 113 | VN | 5.0 | — | — | — | — | U1 | 73.0 | ZnO(2) | 20.0 |
| 114 | VN | 5.0 | — | — | — | — | U1 | 73.0 | ZnO(2) | 20.0 |
| 115 | VN | 5.0 | — | — | — | — | U1 | 73.0 | ZnO(2) | 20.0 |
| 116 | VN | 5.0 | — | — | — | — | U1 | 73.0 | ZnO(2) | 20.0 |
| 117 | VN | 5.0 | — | — | — | — | U1 | 73.0 | ZnO(2) | 20.0 |
| 118 | VN | 5.0 | — | — | — | — | U1 | 73.0 | ZnO(2) | 20.0 |
| 119 | VN | 5.0 | — | — | — | — | U2 | 75.0 | ZnO(2) | 20.0 |
| 120 | VN | 5.0 | — | — | — | — | U3 | 75.0 | ZnO(2) | 20.0 |
| 121 | VN | 5.0 | Si | 20 | — | — | U2 | 50.0 | ZnO(2) | 20.0 |
| 122 | VN | 5.0 | Si | 20 | — | — | U3 | 50.0 | ZnO(2) | 20.0 |

TABLE 5-continued

| | | | | | | | | | | |
|---|---|---|---|---|---|---|---|---|---|---|
| 123 | VN | 5.0 | Si | 5 | PMA | 25 | U2 | 40.0 | ZnO(2) | 20.0 |
| 124 | VN | 5.0 | Si | 5 | PMA | 25 | U3 | 40.0 | ZnO(2) | 20.0 |

| Water-based composition no. | D Oxide particles (other than ZnO(2)) | | E Other addition agents | | Expression (2) right side | Expression (3) right side | Expression (4) right side | Remarks |
|---|---|---|---|---|---|---|---|---|
| | Type | Concentration (mass %) | Type | Concentration (mass %) | | | | |
| 101 | MgO | 5.0 | — | — | 10.0 | 50.0 | 2.5 | Example |
| 102 | CaO | 5.0 | — | — | 10.0 | 50.0 | 2.5 | Example |
| 103 | ZnO(1) | 5.0 | — | — | 10.0 | 50.0 | 2.5 | Example |
| 104 | SrO | 5.0 | — | — | 10.0 | 50.0 | 2.5 | Example |
| 105 | MgO | 0.5 | — | — | 10.0 | 50.0 | 2.5 | Example |
| 106 | MgO | 1.0 | — | — | 10.0 | 50.0 | 2.5 | Example |
| 107 | MgO | 10.0 | — | — | 10.0 | 50.0 | 2.5 | Example |
| 108 | MgO | 5.0 | — | — | 10.0 | 50.0 | 2.5 | Example |
| 109 | MgO | 5.0 | — | — | 10.0 | 50.0 | 2.5 | Example |
| 110 | MgO | 5.0 | — | — | 10.0 | 50.0 | 2.5 | Example |
| 111 | MgO | 5.0 | — | — | 10.0 | 50.0 | 2.5 | Example |
| 112 | MgO | 5.0 | — | — | 10.0 | 50.0 | 2.5 | Example |
| 113 | — | — | WAX1 | 2.0 | 10.0 | 50.0 | 2.5 | Example |
| 114 | — | — | WAX2 | 2.0 | 10.0 | 50.0 | 2.5 | Example |
| 115 | — | — | WAX3 | 2.0 | 10.0 | 50.0 | 2.5 | Example |
| 116 | — | — | WAX4 | 2.0 | 10.0 | 50.0 | 2.5 | Example |
| 117 | — | — | WAX5 | 2.0 | 10.0 | 50.0 | 2.5 | Example |
| 118 | — | — | CS | 2.0 | 10.0 | 50.0 | 2.5 | Example |
| 119 | — | — | — | — | 10.0 | 50.0 | 2.5 | Example |
| 120 | — | — | — | — | 10.0 | 50.0 | 2.5 | Example |
| 121 | MgO | 5.0 | — | — | 10.0 | 50.0 | 2.5 | Example |
| 122 | MgO | 5.0 | — | — | 10.0 | 50.0 | 2.5 | Example |
| 123 | MgO | 5.0 | — | — | 10.0 | 50.0 | 2.5 | Example |
| 124 | MgO | 5.0 | — | — | 10.0 | 50.0 | 2.5 | Example |

TABLE 6

| Sample no. | Plated steel sheet Type | Pre-treatment film Type | Resin coating film Water-based composition | | Each test before chemical treatment | | | Each test after zinc phosphate treatment | | Each test after Zr treatment |
|---|---|---|---|---|---|---|---|---|---|---|
| | | | No | Coating mass (g/m²) | Corrosion resistance before electro-deposition coating | Weldability contact resistivity | Continuous spot weldability | Coating film adhesion | Corrosion resistance after electro-deposition coating | Coating film adhesion |
| 1 | GA | None | 1 | 4 | 3 | 1 | 1 | 2 | 3 | — |
| 2 | GA | None | 2 | 4 | 2 | 1 | 1 | 3 | 3 | — |
| 3 | GA | None | 3 | 4 | 2 | 2 | 3 | 3 | 3 | — |
| 4 | GA | None | 4 | 4 | 2 | 2 | 2 | 3 | 3 | — |
| 5 | GA | None | 5 | 4 | 1 | 2 | 3 | 2 | 2 | — |
| 6 | GA | None | 6 | 4 | 2 | 2 | 2 | 3 | 3 | — |
| 7 | GA | None | 7 | 4 | 3 | 3 | 4 | 3 | 3 | — |
| 8 | GA | None | 8 | 4 | 4 | 4 | 2 | 2 | 3 | — |
| 9 | GA | None | 9 | 4 | 4 | 4 | 2 | 3 | 4 | — |
| 10 | GA | None | 10 | 4 | 4 | 4 | 3 | 4 | 4 | — |
| 11 | GA | None | 11 | 4 | 4 | 4 | 4 | 4 | 4 | — |
| 12 | GA | None | 12 | 4 | 4 | 4 | 4 | 4 | 4 | — |
| 13 | GA | None | 13 | 4 | 4 | 2 | 4 | 4 | 4 | — |
| 14 | GA | None | 14 | 4 | 2 | 2 | 4 | 2 | 3 | — |
| 15 | GA | None | 15 | 4 | 4 | 4 | 3 | 4 | 4 | — |
| 16 | GA | None | 16 | 4 | 4 | 4 | 4 | 4 | 4 | — |
| 17 | GA | None | 17 | 4 | 4 | 4 | 4 | 4 | 4 | — |
| 18 | GA | None | 18 | 4 | 4 | 4 | 4 | 4 | 4 | — |
| 19 | GA | None | 19 | 4 | 4 | 3 | 4 | 3 | 4 | — |
| 20 | GA | None | 20 | 4 | 2 | 2 | 4 | 2 | 3 | — |
| 21 | GA | None | 21 | 4 | 4 | 4 | 2 | 4 | 3 | — |
| 22 | GA | None | 22 | 4 | 4 | 4 | 4 | 4 | 4 | — |
| 23 | GA | None | 23 | 4 | 4 | 4 | 4 | 4 | 4 | — |
| 24 | GA | None | 24 | 4 | 4 | 4 | 4 | 4 | 4 | — |
| 25 | GA | None | 25 | 4 | 4 | 3 | 4 | 3 | 4 | — |
| 26 | GA | None | 26 | 4 | 3 | 3 | 4 | 2 | 3 | — |
| 27 | GA | None | 27 | 4 | 4 | 4 | 2 | 3 | 4 | — |

TABLE 6-continued

| | | | Resin coating film Water-based composition | | Each test before chemical treatment | | | Each test after zinc phosphate treatment | | Each test after Zr treatment |
|---|---|---|---|---|---|---|---|---|---|---|
| | | | | | Corrosion resistance before | Weldability | Continuous | | Corrosion resistance after | |
| Sample no. | Plated steel sheet Type | Pre-treatment film Type | No | Coating mass (g/m²) | electro-deposition coating | contact resistivity | spot weldability | Coating film adhesion | electro-deposition coating | Coating film adhesion |
| 28 | GA | None | 28 | 4 | 4 | 4 | 4 | 4 | 4 | — |
| 29 | GA | None | 29 | 4 | 4 | 4 | 4 | 3 | 4 | — |
| 30 | GA | None | 30 | 4 | 4 | 4 | 4 | 3 | 4 | — |
| 31 | GA | None | 31 | 4 | 4 | 4 | 4 | 3 | 4 | — |
| 32 | GA | None | 32 | 4 | 2 | 3 | 4 | 1 | 2 | — |
| 33 | GA | None | 33 | 4 | 5 | 4 | 4 | 3 | 4 | — |
| 34 | GA | None | 34 | 4 | 5 | 4 | 4 | 3 | 4 | — |
| 35 | GA | None | 35 | 4 | 5 | 4 | 4 | 3 | 4 | — |
| 36 | GA | None | 36 | 4 | 5 | 4 | 4 | 3 | 4 | — |
| 37 | GA | None | 37 | 4 | 5 | 4 | 2 | 3 | 4 | — |
| 38 | GA | None | 38 | 4 | 5 | 4 | 2 | 2 | 4 | — |
| 39 | GA | None | 39 | 4 | 5 | 4 | 2 | 4 | 4 | — |

TABLE 7

| | | | Resin coating film Water-based composition | | Each test before chemical treatment | | | Each test after zinc phosphate treatment | | Each test after Zr treatment |
|---|---|---|---|---|---|---|---|---|---|---|
| | | | | | Corrosion resistance before | Weldability | Continuous | | Corrosion resistance after | |
| Sample no. | Plated steel sheet Type | Pre-treatment film Type | No | Coating mass (g/m²) | electro-deposition coating | contact resistivity | spot weldability | Coating film adhesion | electro-deposition coating | Coating film adhesion |
| 40 | GA | None | 40 | 4 | 4 | 4 | 4 | 4 | 4 | — |
| 41 | GA | None | 41 | 4 | 4 | 4 | 4 | 4 | 4 | — |
| 42 | GA | None | 42 | 4 | 4 | 4 | 4 | 4 | 4 | — |
| 43 | GA | None | 43 | 4 | 4 | 4 | 4 | 4 | 4 | — |
| 44 | GA | None | 44 | 4 | 4 | 4 | 4 | 4 | 4 | — |
| 45 | GA | None | 45 | 4 | 4 | 4 | 4 | 4 | 4 | — |
| 46 | GA | None | 46 | 4 | 4 | 4 | 4 | 4 | 4 | — |
| 47 | GA | None | 47 | 4 | 4 | 4 | 4 | 4 | 4 | — |
| 48 | GA | None | 48 | 4 | 4 | 4 | 4 | 4 | 4 | — |
| 49 | GA | None | 49 | 4 | 4 | 4 | 4 | 3 | 4 | — |
| 50 | GA | None | 50 | 4 | 4 | 4 | 4 | 4 | 4 | — |
| 51 | GA | None | 51 | 4 | 4 | 4 | 4 | 4 | 4 | — |
| 52 | GA | None | 52 | 4 | 4 | 4 | 4 | 4 | 4 | — |
| 53 | GA | None | 53 | 4 | 4 | 4 | 4 | 3 | 4 | — |
| 54 | GA | None | 54 | 4 | 4 | 4 | 4 | 4 | 4 | — |
| 55 | GA | None | 55 | 4 | 4 | 4 | 4 | 4 | 4 | — |
| 56 | GA | None | 56 | 4 | 4 | 4 | 4 | 4 | 4 | — |
| 57 | GA | None | 57 | 4 | 4 | 4 | 4 | 3 | 4 | — |
| 58 | GA | None | 58 | 4 | 4 | 4 | 4 | 4 | 4 | — |
| 59 | GA | None | 59 | 4 | 4 | 4 | 4 | 4 | 4 | — |
| 60 | GA | None | 60 | 4 | 4 | 4 | 4 | 4 | 4 | — |
| 61 | GA | None | 61 | 4 | 4 | 4 | 4 | 3 | 4 | — |
| 62 | GA | None | 62 | 4 | 4 | 4 | 4 | 4 | 4 | — |
| 63 | GA | None | 63 | 4 | 4 | 4 | 4 | 4 | 4 | — |
| 64 | GA | None | 64 | 4 | 4 | 4 | 4 | 4 | 4 | — |
| 65 | GA | None | 65 | 4 | 4 | 4 | 4 | 3 | 4 | — |
| 66 | GA | None | 66 | 4 | 2 | 4 | 4 | 4 | 3 | — |
| 67 | GA | None | 67 | 4 | 2 | 4 | 4 | 4 | 3 | — |
| 68 | GA | None | 68 | 4 | 2 | 4 | 4 | 4 | 3 | — |
| 69 | GA | None | 69 | 4 | 5 | 4 | 4 | 4 | 5 | — |
| 70 | GA | None | 70 | 4 | 5 | 4 | 4 | 4 | 5 | — |
| 71 | GA | None | 71 | 4 | 5 | 4 | 4 | 4 | 5 | — |
| 72 | GA | None | 72 | 4 | 5 | 4 | 4 | 4 | 5 | — |
| 73 | GA | None | 73 | 4 | 5 | 4 | 4 | 4 | 5 | — |
| 74 | GA | None | 74 | 4 | 6 | 4 | 4 | 4 | 6 | — |
| 75 | GA | None | 75 | 4 | 6 | 4 | 4 | 4 | 6 | — |
| 76 | GA | None | 76 | 4 | 5 | 4 | 4 | 4 | 5 | — |
| 77 | GA | None | 77 | 4 | 5 | 4 | 4 | 4 | 5 | — |
| 78 | GA | None | 78 | 4 | 5 | 4 | 4 | 4 | 5 | — |
| 79 | GA | Nene | 79 | 4 | 5 | 4 | 4 | 4 | 5 | — |

TABLE 7-continued

| Sample no. | Plated steel sheet Type | Pre-treatment film Type | Resin coating film Water-based composition No | Coating mass (g/m²) | Each test before chemical treatment | | | Each test after zinc phosphate treatment | | Each test after Zr treatment |
|---|---|---|---|---|---|---|---|---|---|---|
| | | | | | Corrosion resistance before electro-deposition coating | Weldability contact resistivity | Continuous spot weldability | Coating film adhesion | Corrosion resistance after electro-deposition coating | Coating film adhesion |
| 80 | GA | None | 80 | 4 | 5 | 4 | 4 | 4 | 5 | — |
| 81 | GA | None | 81 | 4 | 6 | 4 | 4 | 4 | 6 | — |
| 82 | GA | None | 82 | 4 | 6 | 4 | 4 | 4 | 6 | — |
| 83 | GA | None | 83 | 4 | 5 | 4 | 4 | 4 | 5 | — |
| 84 | GA | None | 84 | 4 | 5 | 4 | 4 | 4 | 5 | — |
| 85 | GA | None | 85 | 4 | 5 | 4 | 4 | 4 | 5 | — |
| 86 | GA | None | 86 | 4 | 5 | 4 | 4 | 4 | 5 | — |
| 87 | GA | None | 87 | 4 | 5 | 4 | 4 | 4 | 5 | — |
| 88 | GA | None | 88 | 4 | 6 | 4 | 4 | 4 | 6 | — |
| 89 | GA | None | 89 | 4 | 6 | 4 | 4 | 4 | 6 | — |
| 90 | GA | None | 90 | 4 | 5 | 4 | 4 | 4 | 5 | — |

TABLE 8

| Sample no. | Plated steel sheet Type | Pre-treatment film Type | Resin coating film Water-based composition No | Coating mass (g/m²) | Each test before chemical treatment | | | Each test after zinc phosphate treatment | | Each test after Zr treatment |
|---|---|---|---|---|---|---|---|---|---|---|
| | | | | | Corrosion resistance before electro-deposition coating | Weldability contact resistivity | Continuous spot weldability | Coating film adhesion | Corrosion resistance after electro-deposition coating | Coating film adhesion |
| 91 | GA | None | 91 | 4 | 6 | 4 | 4 | 4 | 6 | — |
| 92 | GA | None | 92 | 4 | 6 | 4 | 4 | 4 | 6 | — |
| 93 | GA | None | 93 | 4 | 4 | 4 | 4 | 4 | 4 | — |
| 94 | GA | None | 94 | 4 | 4 | 4 | 4 | 4 | 5 | — |
| 95 | GA | None | 95 | 4 | 5 | 4 | 4 | 4 | 5 | — |
| 96 | GA | None | 96 | 4 | 5 | 4 | 4 | 4 | 5 | — |
| 97 | GA | None | 97 | 4 | 4 | 4 | 4 | 4 | 4 | — |
| 98 | GA | None | 98 | 4 | 5 | 4 | 4 | 4 | 6 | — |
| 99 | GA | None | 99 | 4 | 6 | 4 | 4 | 4 | 6 | — |
| 100 | GA | None | 100 | 4 | 6 | 4 | 4 | 4 | 6 | — |
| 101 | GA | None | 101 | 4 | 4 | 4 | 4 | 5 | 4 | — |
| 102 | GA | None | 102 | 4 | 4 | 4 | 4 | 5 | 4 | — |
| 103 | GA | None | 103 | 4 | 4 | 4 | 4 | 5 | 4 | — |
| 104 | GA | None | 104 | 4 | 4 | 4 | 4 | 5 | 4 | — |
| 105 | GA | None | 105 | 4 | 4 | 4 | 4 | 4 | 4 | — |
| 106 | GA | None | 106 | 4 | 4 | 4 | 4 | 5 | 4 | — |
| 107 | GA | None | 107 | 4 | 4 | 4 | 4 | 5 | 4 | 5 |
| 108 | GA | None | 108 | 4 | 5 | 4 | 4 | 5 | 5 | 5 |
| 109 | GA | None | 109 | 4 | 6 | 4 | 4 | 5 | 6 | 5 |
| 110 | GA | None | 110 | 4 | 4 | 4 | 4 | 5 | 4 | 5 |
| 111 | GA | None | 111 | 4 | 5 | 4 | 4 | 5 | 5 | 5 |
| 112 | GA | None | 112 | 4 | 6 | 4 | 4 | 5 | 6 | 5 |
| 113 | GA | None | 113 | 15 | 4 | 4 | 4 | 4 | 4 | — |
| 114 | GA | None | 114 | 15 | 4 | 4 | 4 | 4 | 4 | — |
| 115 | GA | None | 115 | 15 | 4 | 4 | 4 | 4 | 4 | — |
| 116 | GA | None | 116 | 15 | 4 | 4 | 4 | 4 | 4 | — |
| 117 | GA | None | 117 | 15 | 4 | 4 | 4 | 4 | 4 | — |
| 118 | GA | None | 118 | 15 | 4 | 4 | 4 | 4 | 4 | — |
| 119 | GA | None | 119 | 4 | 5 | 4 | 4 | 5 | 4 | — |
| 120 | GA | None | 120 | 4 | 5 | 4 | 4 | 5 | 4 | — |
| 121 | GA | None | 121 | 4 | 6 | 4 | 4 | 5 | 5 | — |
| 122 | GA | None | 122 | 4 | 6 | 4 | 4 | 5 | 5 | — |
| 123 | GA | None | 123 | 4 | 6 | 4 | 4 | 5 | 6 | — |
| 124 | GA | None | 124 | 4 | 6 | 4 | 4 | 5 | 6 | — |

TABLE 9

| | | | Resin coating film Water-based composition | | Each test before chemical treatment | | | Each test after zinc phosphate treatment | | Each test after Zr treatment |
|---|---|---|---|---|---|---|---|---|---|---|
| Sample no. | Plated steel sheet Type | Pre-treatment film Type | No | Coating mass (g/m²) | Corrosion resistance before electro-deposition coating | Weldability contact resistivity | Continuous spot weldability | Coating film adhesion | Corrosion resistance after electro-deposition coating | Coating film adhesion |
| 125 | GA | None | 43 | 1 | 3 | 4 | 3 | 4 | 3 | — |
| 126 | GA | None | 110 | 1 | 3 | 4 | 3 | 5 | 3 | — |
| 127 | GA | None | 111 | 1 | 4 | 4 | 3 | 5 | 4 | — |
| 128 | GA | None | 112 | 1 | 4 | 4 | 3 | 5 | 5 | — |
| 129 | GA | None | 43 | 1.5 | 3 | 4 | 4 | 4 | 4 | — |
| 130 | GA | None | 110 | 1.5 | 3 | 4 | 4 | 5 | 4 | — |
| 131 | GA | None | 111 | 1.5 | 4 | 4 | 4 | 5 | 5 | — |
| 132 | GA | None | 112 | 1.5 | 5 | 4 | 4 | 5 | 6 | — |
| 133 | GA | None | 43 | 15 | 4 | 4 | 4 | 4 | 4 | — |
| 134 | GA | None | 110 | 15 | 4 | 4 | 4 | 5 | 4 | — |
| 135 | GA | None | 111 | 15 | 5 | 4 | 4 | 5 | 5 | — |
| 136 | GA | None | 112 | 15 | 6 | 4 | 4 | 5 | 6 | — |
| 137 | GA | None | 43 | 20 | 5 | 3 | 3 | 4 | 5 | — |
| 138 | GA | None | 110 | 20 | 5 | 3 | 3 | 5 | 5 | — |
| 139 | GA | None | 111 | 20 | 6 | 3 | 3 | 5 | 6 | — |
| 140 | GA | None | 112 | 20 | 6 | 3 | 3 | 5 | 6 | — |
| 141 | GA | None | 43 | 25 | 5 | 3 | 3 | 4 | 5 | — |
| 142 | GA | None | 110 | 25 | 5 | 3 | 3 | 5 | 5 | — |
| 143 | GA | None | 111 | 25 | 6 | 3 | 3 | 5 | 6 | — |
| 144 | GA | None | 112 | 25 | 6 | 3 | 3 | 5 | 6 | — |
| 145 | EG | None | 112 | 4 | 6 | 4 | 4 | 5 | 6 | — |
| 146 | ZL | None | 112 | 4 | 6 | 4 | 4 | 5 | 6 | — |
| 147 | SD | None | 112 | 4 | 6 | 4 | 4 | 5 | 6 | — |
| 148 | AL | None | 112 | 4 | 6 | 4 | 4 | 5 | 6 | — |
| 149 | GI | None | 112 | 4 | 6 | 4 | 4 | 5 | 6 | — |
| 150 | GA | P1 | 43 | 4 | 4 | 3 | 4 | 4 | 5 | — |
| 151 | GA | P2 | 43 | 4 | 4 | 3 | 4 | 4 | 5 | — |
| 152 | GA | P1 | 112 | 4 | 6 | 3 | 4 | 5 | 6 | — |
| 153 | GA | P2 | 112 | 4 | 6 | 3 | 4 | 5 | 6 | — |

Based on the results described above, it was found that coated steel sheet sample numbers 7, 10 to 12, 15 to 19, 22 to 25, 28 to 31, 33 to 36, 40 to 65, and 69 to 153 that satisfied all of the requirements of the present invention had a high level of both corrosion resistance before electrodeposition coating and weldability, and in addition, the coating film adhesion after a zinc phosphate treatment and the coating film adhesion after a zircon treatment were high.

Further, it was found that coated steel sheet sample numbers 7, 10 to 12, 15 to 19, 22 to 25, 28 to 31, 33 to 36, 40 to 65, and 69 to 153 in which vanadium diboride particles, vanadium monoboride particles or vanadium nitride particles were applied as non-oxide ceramic particles containing V were excellent in corrosion resistance compared to the coated steel sheet sample No. 66 in which vanadium-carbide particles were applied.

It was found that the corrosion resistance before electrodeposition coating was high in coated steel sheet sample numbers 69 to 100, 108, 109, 111, 112, 121 to 124, 127, 128, 131, 132, 135, 136, 139, 140, 143 to 149, 152 and 153 that contained an anti-corrosive pigment.

It was found that the corrosion resistance before electrodeposition coating was particularly high in coated steel sheet sample numbers 74, 75, 81, 82, 88, 89, 91, 92, 99, 100, 109, 112, 123, 124, 128, 132, 136, 140, 144 to 149, 152, 153 that contained doped zinc oxide particles and an anti-corrosive pigment containing Mg.

The invention claimed is:

1. A coated steel sheet having a coating film on at least one side of a plated steel sheet, wherein:
the coating film contains:
a binder resin,
non-oxide ceramic particles containing V (excluding VC particles), and
doped zinc oxide particles; and
a content of the non-oxide ceramic particles containing V and a content of the doped zinc oxide particles relative to the coating film satisfy the following expressions:

$$C_{Zn} \geq 10.0 \tag{1}$$

$$C_V \leq 0.5 \cdot C_{Zn} \tag{2}$$

$$C_V \leq 70 - C_{Zn} \tag{3}$$

$$C_V \geq 0.125 \cdot C_{Zn} \tag{4}$$

$$C_V \geq 2.0 \tag{5}$$

where, $C_V$ represents the content (mass %) of the non-oxide ceramic particles containing V, and $C_{Zn}$ represents the content (mass %) of the doped zinc oxide particles.

2. The coated steel sheet according to claim 1, wherein: the coating film contains an anti-corrosive pigment.

3. The coated steel sheet according to claim 1, wherein: the binder resin is a water-soluble or water-dispersible water-based resin.

4. The coated steel sheet according to claim 1, wherein:
the non-oxide ceramic particles containing V are at least one type of particle selected from a group consisting of:
vanadium monoboride particles (VB particles),
vanadium diboride particles (VB$_2$ particles), and
vanadium nitride particles (VN particles).

5. The coated steel sheet according to claim 1, wherein:
the coating film further contains at least one type of particle selected from a group consisting of:
non-doped zinc oxide particles,
magnesium oxide particles,
calcium oxide particles, and
strontium oxide particles,
in a total amount within a range of 1.0 to 10.0 mass % relative to the coating film.

6. The coated steel sheet according to claim 2, wherein:
the anti-corrosive pigment contains Mg, in an amount within a range of 5.0 to 40.0 mass % relative to the coating film.

7. The coated steel sheet according to claim 1, wherein:
the plated steel sheet is a galvanized steel sheet or an aluminum-plated steel sheet.

8. A painted member, comprising:
a formed material comprising a coated steel sheet according to claim 1, and having the coating film, and
an electrodeposition coating film that is formed on the coating film.

9. A painted member, comprising:
a formed material comprising a coated steel sheet according to claim 2, and having the coating film, and
an electrodeposition coating film that is formed on the coating film.

10. A painted member, comprising:
a formed material comprising a coated steel sheet according to claim 3, and having the coating film, and
an electrodeposition coating film that is formed on the coating film.

11. A painted member, comprising:
a formed material comprising a coated steel sheet according to claim 4, and having the coating film, and
an electrodeposition coating film that is formed on the coating film.

12. A painted member, comprising:
a formed material comprising a coated steel sheet according to claim 5, and having the coating film, and
an electrodeposition coating film that is formed on the coating film.

13. A painted member, comprising:
a formed material comprising a coated steel sheet according to claim 6, and having the coating film, and
an electrodeposition coating film that is formed on the coating film.

14. A painted member, comprising:
a formed material comprising a coated steel sheet according to claim 7, and having the coating film, and
an electrodeposition coating film that is formed on the coating film.

* * * * *